(12) United States Patent
L'Huillier et al.

(10) Patent No.: US 10,902,452 B1
(45) Date of Patent: Jan. 26, 2021

(54) CONSUMER BOOKING AVAILABILITY ENGINE

(71) Applicant: Groupon, Inc., Chicago, IL (US)

(72) Inventors: Gaston L'Huillier, San Francisco, CA (US); Francisco Jose Larrain, Palo Alto, CA (US); Ricardo Andres Zilleruelo, Mountain View, CA (US)

(73) Assignee: Groupon, Inc., Chicago, IL (US)

( * ) Notice: Subject to any disclaimer, the term of this patent is extended or adjusted under 35 U.S.C. 154(b) by 410 days.

(21) Appl. No.: 14/316,994

(22) Filed: Jun. 27, 2014

Related U.S. Application Data

(60) Provisional application No. 61/840,867, filed on Jun. 28, 2013.

(51) Int. Cl.
*G06Q 30/02* (2012.01)

(52) U.S. Cl.
CPC ..... *G06Q 30/0235* (2013.01); *G06Q 30/0257* (2013.01)

(58) Field of Classification Search
CPC .................................................. G06Q 30/0235
USPC ...................................................... 705/14.61
See application file for complete search history.

(56) References Cited

U.S. PATENT DOCUMENTS

| | | |
|---|---|---|
| 8,244,566 B1 | 8/2012 | Coley et al. |
| 2013/0030907 A1* | 1/2013 | Lyon .................. G06Q 30/0246 705/14.42 |
| 2013/0339157 A1* | 12/2013 | Reichman ............ G06Q 10/109 705/14.69 |
| 2014/0095232 A1* | 4/2014 | Shiva .................. G06Q 10/1093 705/7.12 |
| 2014/0207509 A1* | 7/2014 | Yu ....................... G06Q 10/1095 705/7.19 |
| 2014/0278671 A1* | 9/2014 | Leonhardt .......... G06Q 10/1095 705/7.19 |
| 2014/0279058 A1 | 9/2014 | Mullins et al. |

OTHER PUBLICATIONS

U.S. Appl. No. 13/832,804, filed Mar. 15, 2013; In re: L'Huilllier et al., entitled *Method for Determining Provider Parameters Including a Provider Margin*.

U.S. Appl. No. 13/796,635, filed Mar. 12, 2013; In re: Vos et al., entitled *Deal Meter*.

(Continued)

*Primary Examiner* — Azam A Ansari
(74) *Attorney, Agent, or Firm* — Alston & Bird LLP

(57) ABSTRACT

A method, apparatus, and computer program product are disclosed for receiving redemption selections from a consumer and scheduling redemption of a promotion. The method includes presenting one or more promotions for products or services offered by a merchant, and receiving an indication of a selection, by a consumer, of a promotion from the one or more promotions. The method further includes presenting one or more time slots based on predicted booking limits of a set of time slots including the one or more time slots, receiving a selection of a time slot from the one or more time slots, determining merchant time slot availability for the selected time slot, and scheduling a time slot for redeeming the promotion based on the determined merchant time slot availability. A corresponding apparatus and computer program product are also provided.

21 Claims, 19 Drawing Sheets

(56) References Cited

OTHER PUBLICATIONS

U.S. Appl. No. 13/631,313, filed Sep. 28, 2012; in re: Shiva et al., entitled *Scheduling Appointments With Deal Offers*, 62 pages.
Office Action for U.S. Appl. No. 14/316,970 dated Oct. 7, 2016, 56 pages.
Office Action for U.S. Appl. No. 14/316,981 dated Oct. 7, 2016, 34 pages.

* cited by examiner

| SELECT TIME SLOT(S): | PREDICTED BOOKING LIMIT | COMMISSION |
|---|---|---|
| 6AM – 7AM | 2 | 20% |
| 7AM – 8AM | 1 | 10% |
| 8AM – 9AM | 2 | 20% |
| 9AM – 10AM | 3 | 30% |
| 10AM – 11AM | 4 | 40% |
| 11AM – 12PM | 3 | 30% |
| 12PM – 1PM | 1 | 10% |
| 1PM – 2PM | 2 | 20% |
| 2PM – 3PM | 5 | 50% |
| 3PM – 4PM | 6 | 60% |
| 4PM – 5PM | 5 | 50% |
| 5PM – 6PM | 3 | 30% |
| 6PM – 7PM | 1 | 10% |
| 7PM – 8PM | 2 | 20% |
| 8 PM – 9PM | 3 | 30% |
| 9PM – 10PM | 5 | 50% |
| 10PM – 11PM | 6 | 60% |

FIG. 5

| SELECT TIME SLOT(S): | PREDICTED BOOKING LIMIT | BASIC CUSTOMER COMMISSION | PREFERRED CUSTOMER COMMISSION |
|---|---|---|---|
| 6AM – 7AM | 2 | 20% | 15% |
| 7AM – 8AM | 1 | 10% | 5% |
| 8AM – 9AM | 2 | 20% | 15% |
| 9AM – 10AM | 3 | 30% | 25% |
| 10AM – 11AM | 4 | 40% | 35% |
| 11AM – 12PM | 3 | 30% | 25% |
| 12PM – 1PM | 1 | 10% | 5% |
| 1PM – 2PM | 2 | 20% | 15% |
| 2PM – 3PM | 5 | 50% | 45% |
| 3PM – 4PM | 6 | 60% | 55% |
| 4PM – 5PM | 5 | 50% | 45% |
| 5PM – 6PM | 3 | 30% | 25% |
| 6PM – 7PM | 1 | 10% | 5% |
| 7PM – 8PM | 2 | 20% | 15% |
| 8 PM – 9PM | 3 | 30% | 25% |
| 9PM – 10PM | 5 | 50% | 45% |
| 10PM – 11PM | 6 | 60% | 55% |

1002
Restaurant Promotion

1008
Forest Vacation Promotion

1004
Car Maintenance Promotion

1010
Bathroom Remodeling Promotion

1006
Tropical Getaway Promotion

1012
Seafood Promotion

1500

PROMOTION REDEMPTION SCHEDULING REQUEST

SELECT PROMOTION:

Running Gait Analysis — 1502

WHEN DO YOU WANT TO REDEEM THIS PROMOTION?

DATE — 1504

06/30/2013

| | June 13 | | | | | |
|---|---|---|---|---|---|---|
| M | T | W | T | F | S | S |
| | | | | | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

TIME WINDOW — 1506

6:00AM

TO

— 1508

11:00PM

1510

SEND

FIG. 15

CONSUMER BOOKING AVAILABILITY ENGINE

CROSS-REFERENCE TO RELATED APPLICATIONS

This application claims the benefit of U.S. Provisional Patent Application 61/840,867, filed Jun. 28, 2013, the entire contents of which are incorporated herein by reference.

TECHNOLOGICAL FIELD

Example embodiments of the present invention relate generally to promotion management and, more particularly, to a method and apparatus for determining an estimated availability of a merchant at a given time.

BACKGROUND

Applicant has discovered problems with existing methods and systems for promotion management. Through applied effort, ingenuity, and innovation, Applicant has solved many of these identified problems by developing a solution that is embodied by the present invention and described in detail below.

BRIEF SUMMARY

Accordingly, a method, apparatus, and computer program product are provided for improving the booking of time slots for redeeming promotions.

In a first example embodiment, a method is provided. The method includes presenting, by a consumer interface, one or more promotions for products or services offered by a merchant, receiving an indication of a selection, by a consumer, of a promotion from the one or more promotions, and presenting, by the consumer interface, one or more time slots based on predicted booking limits of a set of time slots including the one or more time slots, wherein each time slot indicates a period of time during which the promotion may be scheduled for redemption. The method further includes receiving a selection of a time slot from the one or more time slots, determining, by a processor, merchant time slot availability for the selected time slot, and scheduling a time slot for redeeming the promotion based on the determined merchant time slot availability.

In some embodiments of the method, the method further includes calculating the predicted booking limits of the set of time slots by, for each time slot, calculating a hidden demand, determining an optimal booking limit for the time slot based on the calculated hidden demand, setting a value of the predicted booking limit to the value of the optimal booking limit, and storing the predicted booking limit. In one such embodiment, for each time slot, determining the optimal booking limit is further based on a booking capacity of the time slot.

In other embodiments of the method, presenting the one or more time slots based on predicted booking limits of the set of time slots including the one or more time slots comprises determining, for each time slot of the set of time slots, whether the predicted booking limit of the time slot is equal to or greater than a current number of bookings for the time slot, wherein the one or more time slots presented comprise those of the set of time slots for which the predicted booking limit is less than the current number of bookings.

In another embodiment of the method, presenting the one or more time slots to the consumer is further based on a membership status of the consumer. In this regard, presenting the one or more time slots may include presenting additional time slots in an instance in which the consumer is identified a preferred member.

In some embodiments of the method, the one or more time slots include preferred time slots. In one such embodiment, the preferred time slots are chosen based on preferences of the merchant or a promotion and marketing service.

In other embodiments of the method, determining merchant time slot availability for the selected time slot includes presenting, to the merchant offering the promotion, the selected time slot, and receiving, from the merchant, an indication of whether the time slot is available.

In yet other embodiments, the method includes issuing, to the consumer, a voucher for redeeming the promotion at the scheduled time slot. In one such embodiment, the method further includes charging the consumer for the promotion in response to issuing the voucher.

In another embodiment, the method includes, in an instance in which the selected time slot is not available, repeating the steps of presenting one or more time slots, receiving a selection of a time slot, and determining merchant time slot availability until a selected time slot is available.

In another example embodiment, an apparatus is provided. The apparatus includes a processor and a memory, the memory storing computer program code that, when executed by the processor, causes the apparatus to present, by a consumer interface, one or more promotions for products or services offered by a merchant, receive an indication of a selection, by a consumer, of a promotion from the one or more promotions, and present, by the consumer interface, one or more time slots based on predicted booking limits of a set of time slots including the one or more time slots, wherein each time slot indicates a period of time during which the promotion may be scheduled for redemption. The computer program code, when executed by the processor, further causes the apparatus to receive a selection of a time slot from the one or more time slots, determine merchant time slot availability for the selected time slot, and schedule a time slot for redeeming the promotion based on the determined merchant time slot availability.

In some embodiments of the apparatus, the computer program code, when executed by the processor, further causes the apparatus to calculate the predicted booking limits of the set of time slots by, for each time slot, calculating a hidden demand, determining an optimal booking limit for the time slot based on the calculated hidden demand, setting a value of the predicted booking limit to the value of the optimal booking limit, and storing the predicted booking limit. In one such embodiment, for each time slot, determining the optimal booking limit is further based on a booking capacity of the time slot.

In other embodiments of the apparatus, presenting the one or more time slots based on predicted booking limits of the set of time slots including the one or more time slots includes determining, for each time slot of the set of time slots, whether the predicted booking limit of the time slot is equal to or greater than a current number of bookings for the time slot, wherein the one or more time slots presented comprise those of the set of time slots for which the predicted booking limit is less than the current number of bookings.

In yet other embodiments of the apparatus, presenting the one or more time slots to the consumer is further based on a membership status of the consumer. In one such embodiment, presenting the one or more time slots includes presenting additional time slots in an instance in which the consumer is identified a preferred member.

In another embodiment of the apparatus, the one or more time slots include preferred time slots. In one such embodiment, the preferred time slots are chosen based on preferences of the merchant or a promotion and marketing service.

In another embodiment of the apparatus, determining merchant time slot availability for the selected time slot includes presenting, to the merchant offering the promotion, the selected time slot, and receiving, from the merchant, an indication of whether the time slot is available.

In other embodiments of the apparatus, the computer program code, when executed by the processor, further causes the apparatus to issue, to the consumer, a voucher for redeeming the promotion at the scheduled time slot. In one such embodiment, the computer program code, when executed by the processor, further causes the apparatus to charge the consumer for the promotion in response to issuing the voucher.

In another embodiment of the apparatus, the computer program code, when executed by the processor, further causes the apparatus to, in an instance in which the selected time slot is not available, repeat the steps of presenting one or more time slots, receiving a selection of a time slot, and determining merchant time slot availability until a selected time slot is available.

In another example embodiment, a computer program product is provided. The computer program product comprising a non-transitory computer-readable storage medium storing computer program code that, when executed by an apparatus, causes the apparatus to present, by a consumer interface, one or more promotions for products or services offered by a merchant, receive an indication of a selection, by a consumer, of a promotion from the one or more promotions, and present, by the consumer interface, one or more time slots based on predicted booking limits of a set of time slots including the one or more time slots, wherein each time slot indicates a period of time during which the promotion may be scheduled for redemption. The computer program code, when executed by the apparatus, further causes the apparatus to receive a selection of a time slot from the one or more time slots, determine merchant time slot availability for the selected time slot, and schedule a time slot for redeeming the promotion based on the determined merchant time slot availability.

In some embodiments of the computer program product, the computer program code, when executed by the apparatus, further causes the apparatus to calculate the predicted booking limits of the set of time slots by, for each time slot, calculating a hidden demand, determining an optimal booking limit for the time slot based on the calculated hidden demand, setting a value of the predicted booking limit to the value of the optimal booking limit, and storing the predicted booking limit. In one such embodiment, for each time slot, determining the optimal booking limit is further based on a booking capacity of the time slot.

In other embodiments of the computer program product, presenting the one or more time slots based on predicted booking limits of the set of time slots including the one or more time slots includes determining, for each time slot of the set of time slots, whether the predicted booking limit of the time slot is equal to or greater than a current number of bookings for the time slot, wherein the one or more time slots presented comprise those of the set of time slots for which the predicted booking limit is less than the current number of bookings.

In yet other embodiments, presenting the one or more time slots to the consumer is further based on a membership status of the consumer. In one such embodiment, presenting the one or more time slots includes presenting additional time slots in an instance in which the consumer is identified a preferred member.

In other embodiments of the computer program product, the one or more time slots include preferred time slots. In one such embodiment, the preferred time slots are chosen based on preferences of the merchant or a promotion and marketing service.

In another embodiment of the computer program product, determining merchant time slot availability for the selected time slot includes presenting, to the merchant offering the promotion, the selected time slot, and receiving, from the merchant, an indication of whether the time slot is available.

In yet other embodiments of the computer program product, the computer program code, when executed by the apparatus, further causes the apparatus to issue, to the consumer, a voucher for redeeming the promotion at the scheduled time slot. In one such embodiment, the computer program code, when executed by the apparatus, further causes the apparatus to charge the consumer for the promotion in response to issuing the voucher.

In another embodiment of the computer program product, the computer program code, when executed by the apparatus, further causes the apparatus to, in an instance in which the selected time slot is not available, repeat the steps of presenting one or more time slots, receiving a selection of a time slot, and determining merchant time slot availability until a selected time slot is available.

In another example embodiment, a method is provided. The method includes presenting, by a consumer interface, one or more promotions for products or services offered by a merchant, receiving an indication of a selection, by a consumer, of a promotion from the one or more promotions, and presenting, by the consumer interface, a plurality of time slots, wherein each time slot indicates a period of time during which the promotion may be scheduled for redemption. The method further includes receiving a selection of multiple time slots from the plurality of time slots, determining, by a processor, merchant time slot availability for the selected time slots, and scheduling a time slot for redeeming the promotion based on the determined merchant time slot availability.

In some embodiments of the method, presenting the plurality of time slots is based on predicted booking limits of a set of time slots including the plurality of time slots. In one such embodiment, the method further includes calculating the predicted booking limits of the set of time slots by, for each time slot, calculating a hidden demand, determining an optimal booking limit for the time slot based on the calculated hidden demand, setting a value of the predicted booking limit to the value of the optimal booking limit, and storing the predicted booking limit. In this regard, for each time slot, determining the optimal booking limit may be further based on a booking capacity of the time slot. In another such embodiment, presenting the plurality of time slots based on predicted booking limits of the set of time slots includes determining, for each time slot of the set of time slots, whether the predicted booking limit of the time slot is equal to or greater than a current number of bookings for the time slot, wherein the plurality of time slots presented comprise those of the set of time slots for which the predicted booking limit is less than the current number of bookings.

In other embodiments of the method, presenting the plurality of time slots to the consumer is further based on a membership status of the consumer. In one such embodiment, presenting the plurality of time slots includes presenting additional time slots in an instance in which the consumer is identified as a preferred member.

In yet other embodiments of the method, the plurality of time slots includes preferred time slots. In one such embodiment, the preferred time slots are chosen based on preferences of the merchant or a promotion and marketing service.

In other embodiments of the method, determining merchant time slot availability for the selected time slots includes presenting, to the merchant offering the promotion, each selected time slot, and receiving, from the merchant, an indication of whether the time slot is available.

In another embodiment, the method further includes receiving, from the consumer, a rank-ordering of the selected time slots, wherein determining merchant time slot availability comprises iteratively analyzing the selected time slots, starting from a highest ranked selected time slot and proceeding in rank order until an indication of availability is received from the merchant, by presenting, to the merchant offering the promotion, a selected time slot, and receiving, from the merchant, an indication of availability for the selected time slot, and wherein the time slot for redeeming the promotion comprises the selected time slot for which the indication of availability is received from the merchant.

In yet other embodiments, the method further includes issuing, to the consumer, a voucher for redeeming the promotion at the scheduled time slot. In one such embodiment, the method further includes charging the consumer for the promotion in response to issuing the voucher.

In other embodiments, the method further includes, in an instance in which the selected time slots are not available, repeating the steps of presenting the plurality of time slots, receiving a selection of multiple time slots, and determining merchant time slot availability until at least one selected time slot is available.

In another example embodiment, an apparatus is provided. The apparatus includes a processor and a memory, the memory storing computer program code that, when executed by the processor, causes the apparatus to present, by a consumer interface, one or more promotions for products or services offered by a merchant, receive an indication of a selection, by a consumer, of a promotion from the one or more promotions, and present, by the consumer interface, a plurality of time slots, wherein each time slot indicates a period of time during which the promotion may be scheduled for redemption. The computer program code, when executed by the processor, further causes the apparatus to receive a selection of multiple time slots from the plurality of time slots, determine merchant time slot availability for the selected time slots, and schedule a time slot for redeeming the promotion based on the determined merchant time slot availability.

In some embodiments of the apparatus, presenting the plurality of time slots is based on predicted booking limits of a set of time slots including the plurality of time slots. In one such embodiment, the method further includes calculating the predicted booking limits of the set of time slots by, for each time slot, calculating a hidden demand, determining an optimal booking limit for the time slot based on the calculated hidden demand, setting a value of the predicted booking limit to the value of the optimal booking limit, and storing the predicted booking limit. In this regard, for each time slot, determining the optimal booking limit may be further based on a booking capacity of the time slot. In another such embodiment, presenting the plurality of time slots based on predicted booking limits of the set of time slots includes determining, for each time slot of the set of time slots, whether the predicted booking limit of the time slot is equal to or greater than a current number of bookings for the time slot, wherein the plurality of time slots presented comprise those of the set of time slots for which the predicted booking limit is less than the current number of bookings.

In other embodiments of the apparatus, presenting the plurality of time slots to the consumer is further based on a membership status of the consumer. In one such embodiment, presenting the plurality of time slots includes presenting additional time slots in an instance in which the consumer is identified as a preferred member.

In yet other embodiments of the apparatus, the plurality of time slots includes preferred time slots. In one such embodiment, the preferred time slots are chosen based on preferences of the merchant or a promotion and marketing service.

In other embodiments of the apparatus, determining merchant time slot availability for the selected time slots includes presenting, to the merchant offering the promotion, each selected time slot, and receiving, from the merchant, an indication of whether the time slot is available.

In another embodiment of the apparatus, the computer program code, when executed by the processor, further causes the apparatus to receive, from the consumer, a rank-ordering of the selected time slots, wherein determining merchant time slot availability comprises iteratively analyzing the selected time slots, starting from a highest ranked selected time slot and proceeding in rank order until an indication of availability is received from the merchant, by presenting, to the merchant offering the promotion, a selected time slot, and receiving, from the merchant, an indication of availability for the selected time slot, and wherein the time slot for redeeming the promotion comprises the selected time slot for which the indication of availability is received from the merchant.

In yet other embodiments of the apparatus, the computer program code, when executed by the processor, further causes the apparatus to issue, to the consumer, a voucher for redeeming the promotion at the scheduled time slot. In one such embodiment, the computer program code, when executed by the processor, further causes the apparatus to charge the consumer for the promotion in response to issuing the voucher.

In other embodiments, the computer program code, when executed by the processor, further causes the apparatus to, in an instance in which the selected time slots are not available, repeat the steps of presenting the plurality of time slots, receiving a selection of multiple time slots, and determining merchant time slot availability until at least one selected time slot is available.

In another example embodiment, a computer program product is provided. The computer program product includes a non-transitory computer-readable storage medium storing computer program code that, when executed by an apparatus, causes the apparatus to present, by a consumer interface, one or more promotions for products or services offered by a merchant, receive an indication of a selection, by a consumer, of a promotion from the one or more promotions, and present, by the consumer interface, a plurality of time slots, wherein each time slot indicates a period of time during which the promotion may be scheduled for redemption. The computer program code, when executed by the apparatus, further causes the apparatus to receive a selection of multiple time slots from the plurality of time slots, determine merchant time slot availability for the selected time slots, and schedule a time slot for redeeming the promotion based on the determined merchant time slot availability.

In some embodiments of the computer program product, presenting the plurality of time slots is based on predicted booking limits of a set of time slots including the plurality of time slots. In one such embodiment, the method further includes calculating the predicted booking limits of the set of time slots by, for each time slot, calculating a hidden demand, determining an optimal booking limit for the time slot based on the calculated hidden demand, setting a value of the predicted booking limit to the value of the optimal booking limit, and storing the predicted booking limit. In this regard, for each time slot, determining the optimal booking limit may be further based on a booking capacity of the time slot. In another such embodiment, presenting the plurality of time slots based on predicted booking limits of the set of time slots includes determining, for each time slot of the set of time slots, whether the predicted booking limit of the time slot is equal to or greater than a current number of bookings for the time slot, wherein the plurality of time slots presented comprise those of the set of time slots for which the predicted booking limit is less than the current number of bookings.

In other embodiments of the computer program product, presenting the plurality of time slots to the consumer is further based on a membership status of the consumer. In one such embodiment, presenting the plurality of time slots includes presenting additional time slots in an instance in which the consumer is identified as a preferred member.

In yet other embodiments of the computer program product, the plurality of time slots includes preferred time slots. In one such embodiment, the preferred time slots are chosen based on preferences of the merchant or a promotion and marketing service.

In other embodiments of the computer program product, determining merchant time slot availability for the selected time slots includes presenting, to the merchant offering the promotion, each selected time slot, and receiving, from the merchant, an indication of whether the time slot is available.

In another embodiment of the computer program product, the computer program code, when executed by the apparatus, further causes the apparatus to receive, from the consumer, a rank-ordering of the selected time slots, wherein determining merchant time slot availability comprises iteratively analyzing the selected time slots, starting from a highest ranked selected time slot and proceeding in rank order until an indication of availability is received from the merchant, by presenting, to the merchant offering the promotion, a selected time slot, and receiving, from the merchant, an indication of availability for the selected time slot, and wherein the time slot for redeeming the promotion comprises the selected time slot for which the indication of availability is received from the merchant.

In yet other embodiments of the computer program product, the computer program code, when executed by the apparatus, further causes the apparatus to issue, to the consumer, a voucher for redeeming the promotion at the scheduled time slot. In one such embodiment, the computer program code, when executed by the processor, further causes the apparatus to charge the consumer for the promotion in response to issuing the voucher.

In other embodiments, the computer program code, when executed by the apparatus, further causes the apparatus to, in an instance in which the selected time slots are not available, repeat the steps of presenting the plurality of time slots, receiving a selection of multiple time slots, and determining merchant time slot availability until at least one selected time slot is available.

In another example embodiment, a method is provided. The method includes presenting, by a consumer interface, one or more promotions for products or services offered by a merchant, receiving, from a consumer, an indication of a selection of a promotion from the one or more promotions, receiving, from the consumer, a time window within which the consumer seeks to redeem the promotion, and scheduling, by a processor, a time slot for redeeming the promotion based on the time window, wherein the time slot comprises a time period within the time window.

In some embodiments of the method, scheduling a time slot for redeeming the promotion based on the time window includes identifying a set of time slots within the time window, determining merchant time slot availability for the set of time slots, and scheduling the time slot for redeeming the promotion based on the merchant time slot availability. In one such embodiment, the set of time slots is further based on a membership status of the consumer. In this regard, the set of time slots may include additional time slots in an instance in which the consumer is identified as a preferred member. In another such embodiment, the set of time slots includes preferred time slots. In this case, the preferred time slots may be chosen based on preferences of the merchant or a promotion and marketing service.

In another embodiment of the method, determining merchant time slot availability for the set of time slots includes presenting, to the merchant offering the promotion, each time slot of the set of time slots, and receiving, from the merchant, confirmation of time slot availability for each time slot of the set of time slots.

In yet another embodiment, the method further includes issuing, to the consumer, a voucher for redeeming the promotion at the scheduled time slot. In this regard, the method may further include charging the consumer for the promotion in response to issuing the voucher.

In another embodiment, in an instance in which no time slots are available within the time window, scheduling the time slot for redeeming the promotion based on the time window includes presenting, by the consumer interface, a request for an alternative time window, receiving, from the consumer, a second time window within which the consumer seeks to redeem the promotion, and scheduling the time slot for redeeming the promotion based on the second time window.

In another example embodiment, an apparatus is provided. The apparatus includes a processor and a memory, the memory storing computer program code that, when executed by the processor, causes the apparatus to present, by a consumer interface, one or more promotions for products or services offered by a merchant, receive, from a consumer, an indication of a selection of a promotion from the one or more promotions, receive, from the consumer, a time window within which the consumer seeks to redeem the promotion, and schedule a time slot for redeeming the promotion based on the time window, wherein the time slot comprises a time period within the time window.

In some embodiments of the apparatus, scheduling a time slot for redeeming the promotion based on the time window includes identifying a set of time slots within the time window, determining merchant time slot availability for the set of time slots, and scheduling the time slot for redeeming the promotion based on the merchant time slot availability. In one such embodiment, the set of time slots is further based on a membership status of the consumer. In this regard, the set of time slots may include additional time slots in an instance in which the consumer is identified as a preferred member. In another such embodiment, the set of time slots includes preferred time slots. In this case, the preferred time slots may be chosen based on preferences of the merchant or a promotion and marketing service.

In another embodiment of the apparatus, determining merchant time slot availability for the set of time slots includes presenting, to the merchant offering the promotion, each time slot of the set of time slots, and receiving, from the merchant, confirmation of time slot availability for each time slot of the set of time slots.

In yet another embodiment, the computer program code, when executed by the processor, further causes the apparatus to issue, to the consumer, a voucher for redeeming the promotion at the scheduled time slot. In this regard, the computer program code, when executed by the processor, may further cause the apparatus to charge the consumer for the promotion in response to issuing the voucher.

In another embodiment, in an instance in which no time slots are available within the time window, scheduling the time slot for redeeming the promotion based on the time window includes presenting, by the consumer interface, a request for an alternative time window, receiving, from the consumer, a second time window within which the consumer seeks to redeem the promotion, and scheduling the time slot for redeeming the promotion based on the second time window.

In another example embodiment, a computer program product is provided. The computer program product includes a non-transitory computer-readable storage medium storing computer program code that, when executed by an apparatus, causes the apparatus to present, by a consumer interface, one or more promotions for products or services offered by a merchant, receive, from a consumer, an indication of a selection of a promotion from the one or more promotions, receive, from the consumer, a time window within which the consumer seeks to redeem the promotion, and schedule a time slot for redeeming the promotion based on the time window, wherein the time slot comprises a time period within the time window.

In some embodiments of the computer program product, scheduling a time slot for redeeming the promotion based on the time window includes identifying a set of time slots within the time window, determining merchant time slot availability for the set of time slots, and scheduling the time slot for redeeming the promotion based on the merchant time slot availability. In one such embodiment, the set of time slots is further based on a membership status of the consumer. In this regard, the set of time slots may include additional time slots in an instance in which the consumer is identified as a preferred member. In another such embodiment, the set of time slots includes preferred time slots. In this case, the preferred time slots may be chosen based on preferences of the merchant or a promotion and marketing service.

In another embodiment of the computer program product, determining merchant time slot availability for the set of time slots includes presenting, to the merchant offering the promotion, each time slot of the set of time slots, and receiving, from the merchant, confirmation of time slot availability for each time slot of the set of time slots.

In yet another embodiment, the computer program code, when executed by the apparatus, further causes the apparatus to issue, to the consumer, a voucher for redeeming the promotion at the scheduled time slot. In this regard, the computer program code, when executed by the apparatus, may further cause the apparatus to charge the consumer for the promotion in response to issuing the voucher.

In another embodiment, in an instance in which no time slots are available within the time window, scheduling the time slot for redeeming the promotion based on the time window includes presenting, by the consumer interface, a request for an alternative time window, receiving, from the consumer, a second time window within which the consumer seeks to redeem the promotion, and scheduling the time slot for redeeming the promotion based on the second time window.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
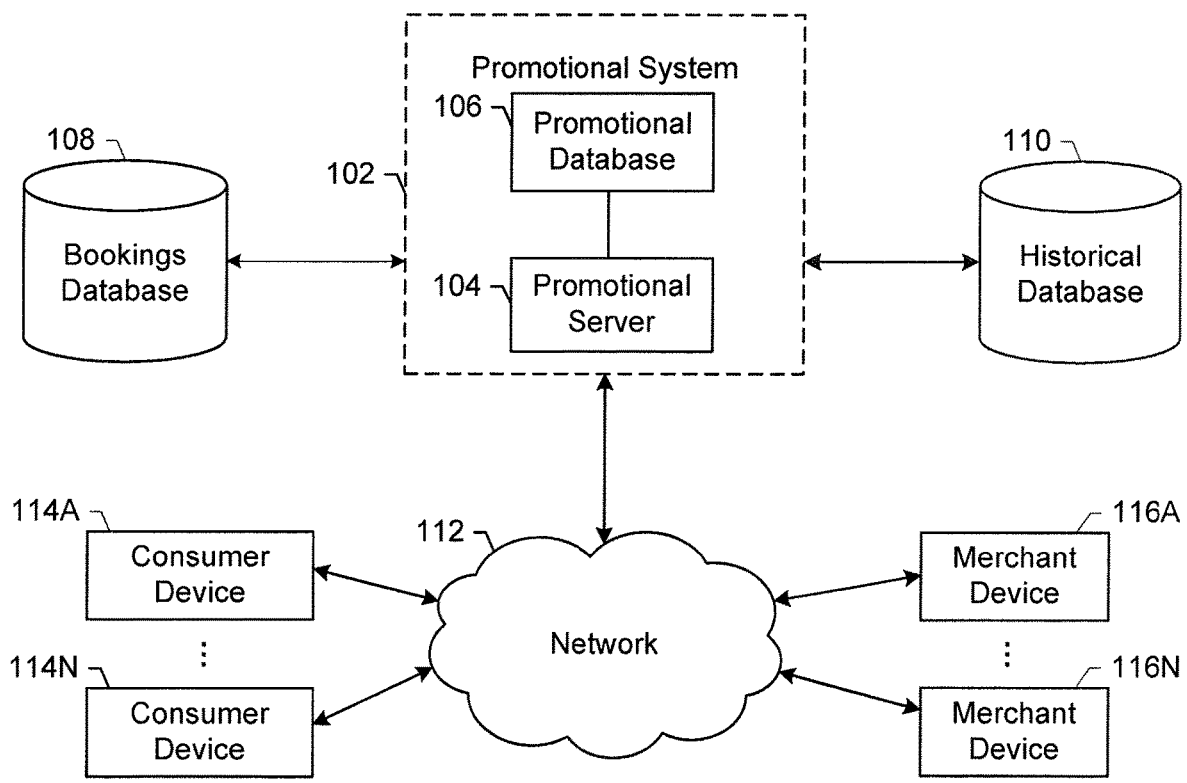
Figure 2:
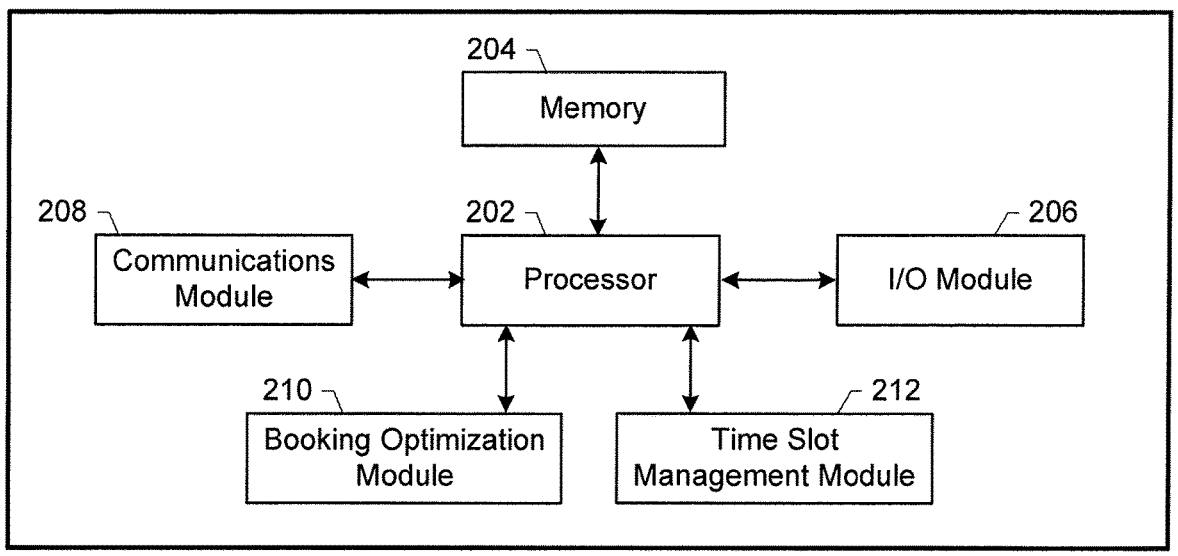
Figure 3:
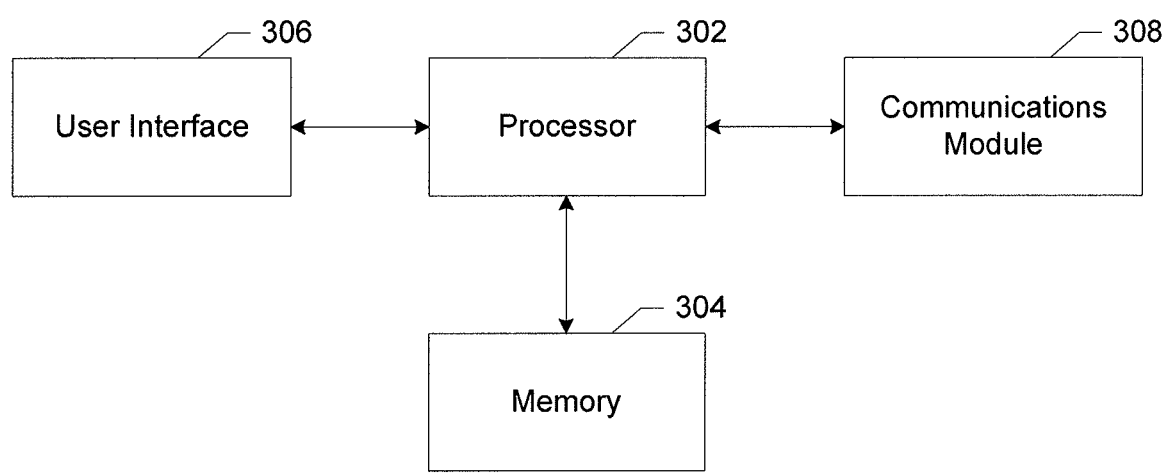
Figure 4:
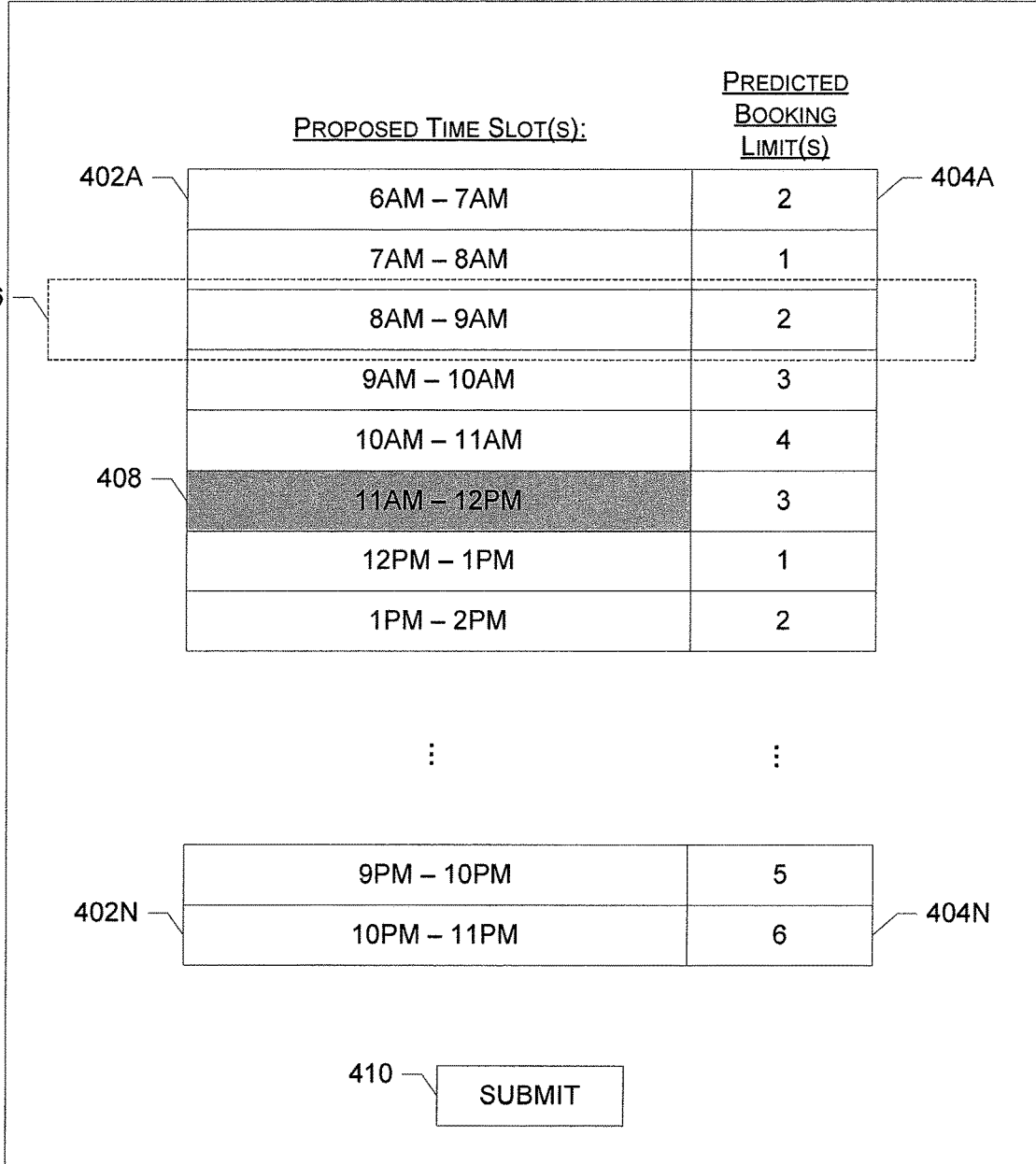
Figure 7:
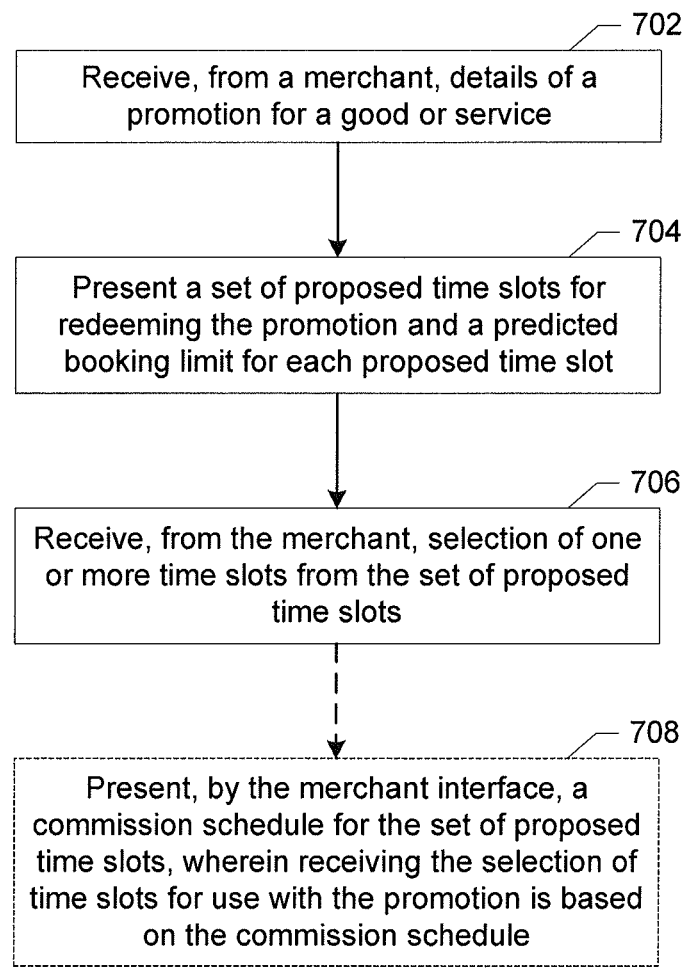
Figure 8:
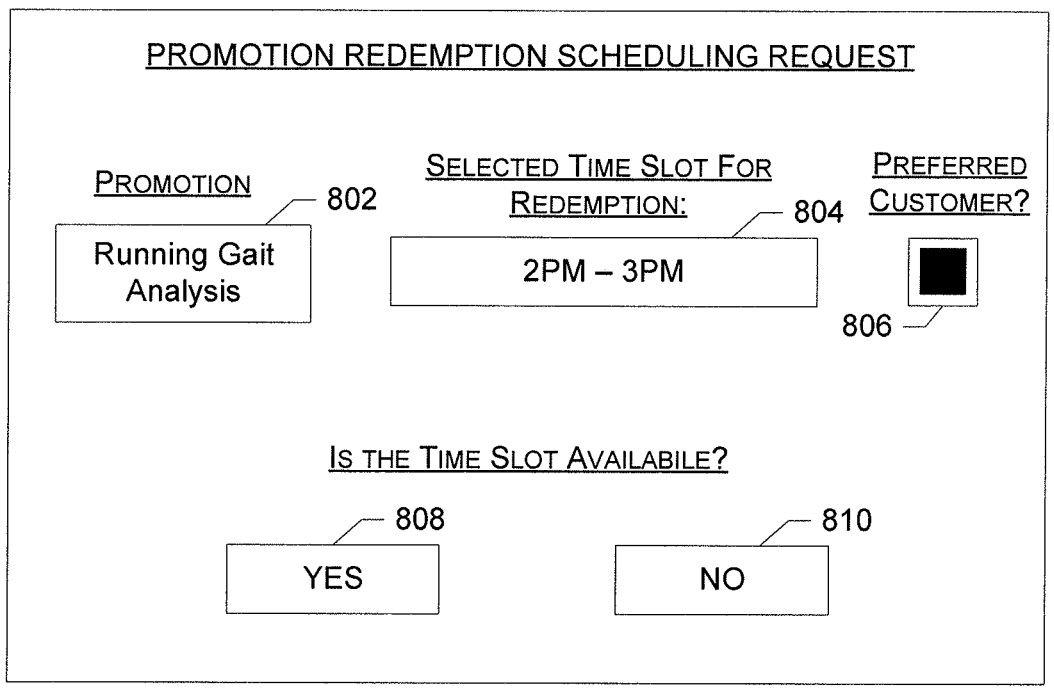
Figure 9:
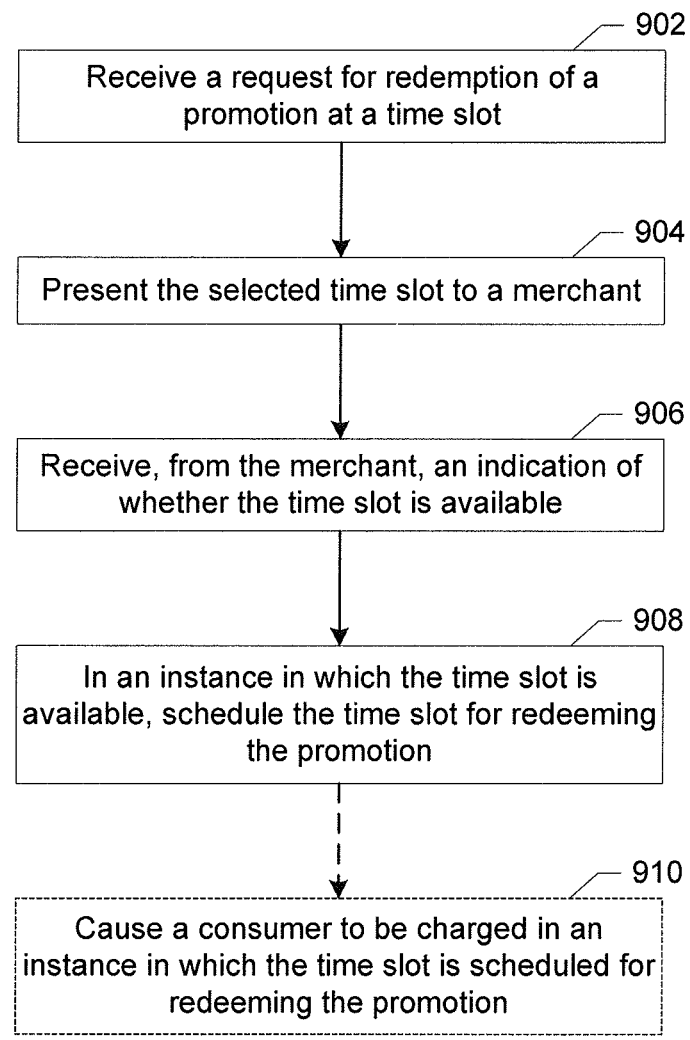
Figure 10:
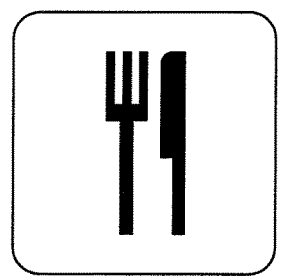
Figure 10:
Figure 10:
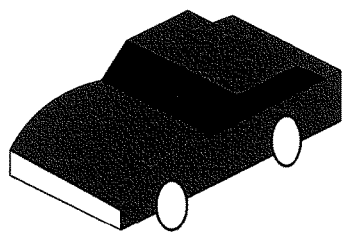
Figure 10:
Figure 10:
Figure 10:
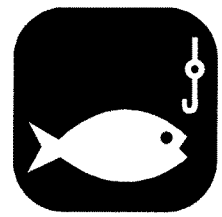
Figure 11:
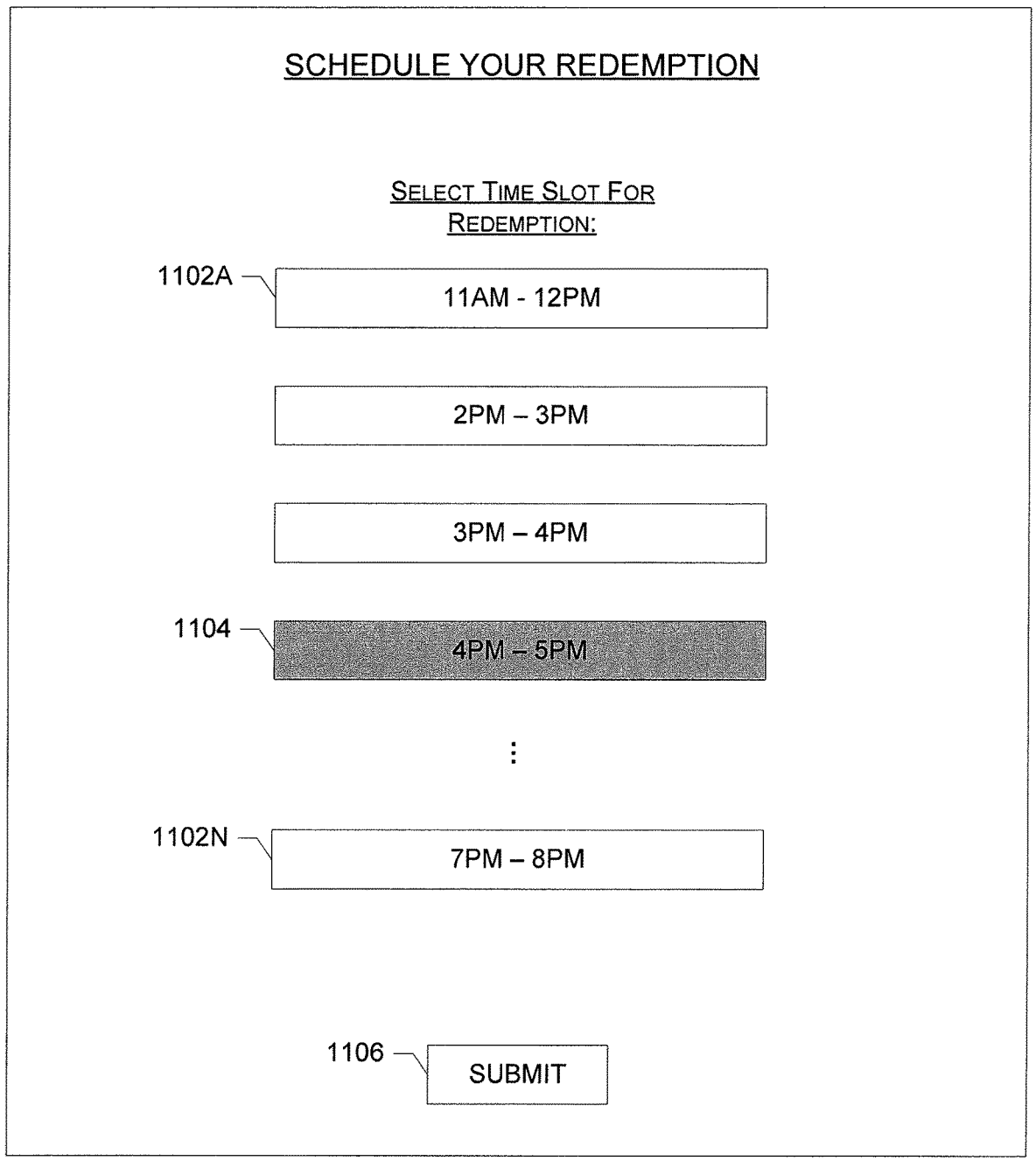
Figure 12:
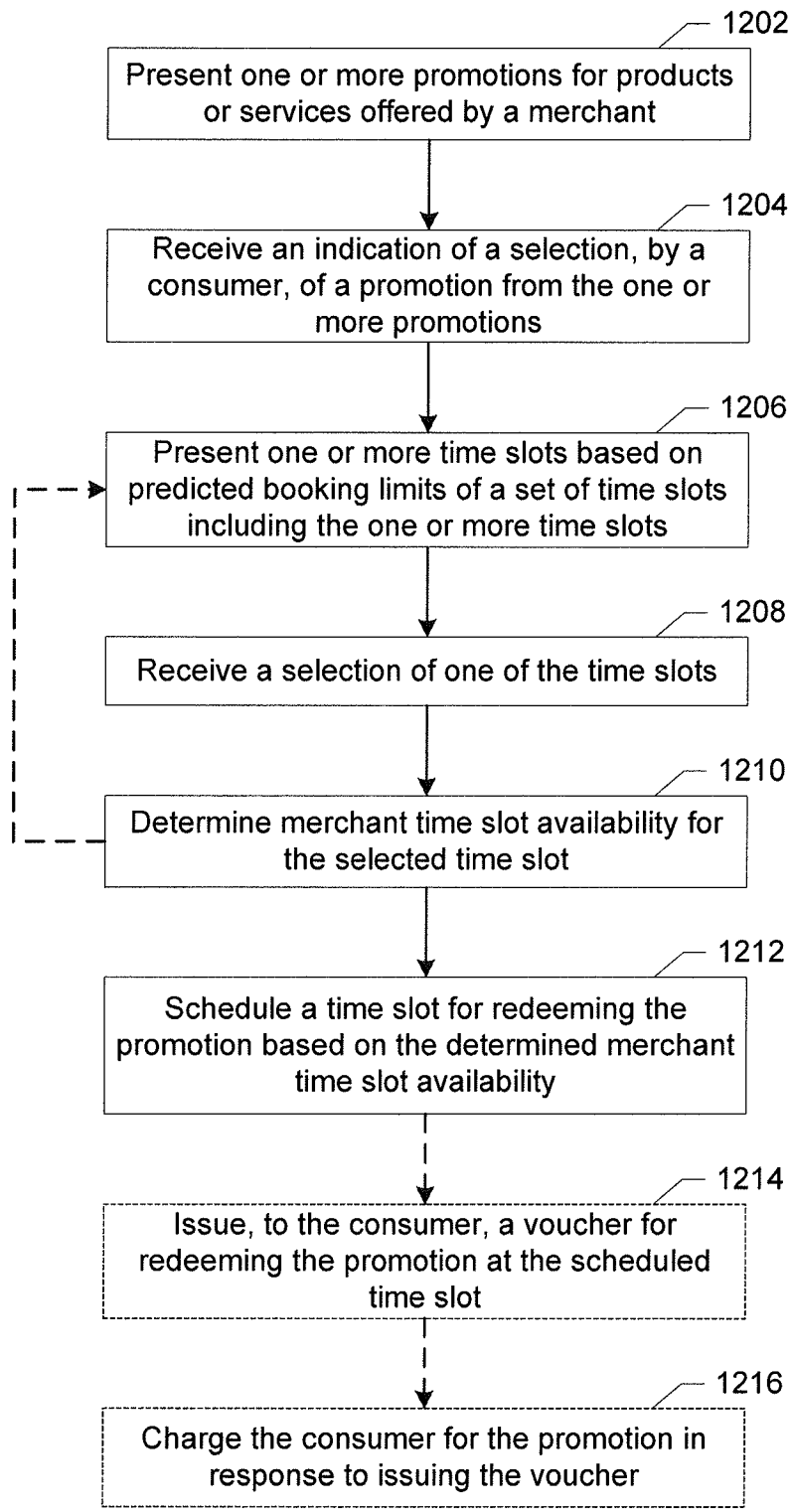
Figure 13:
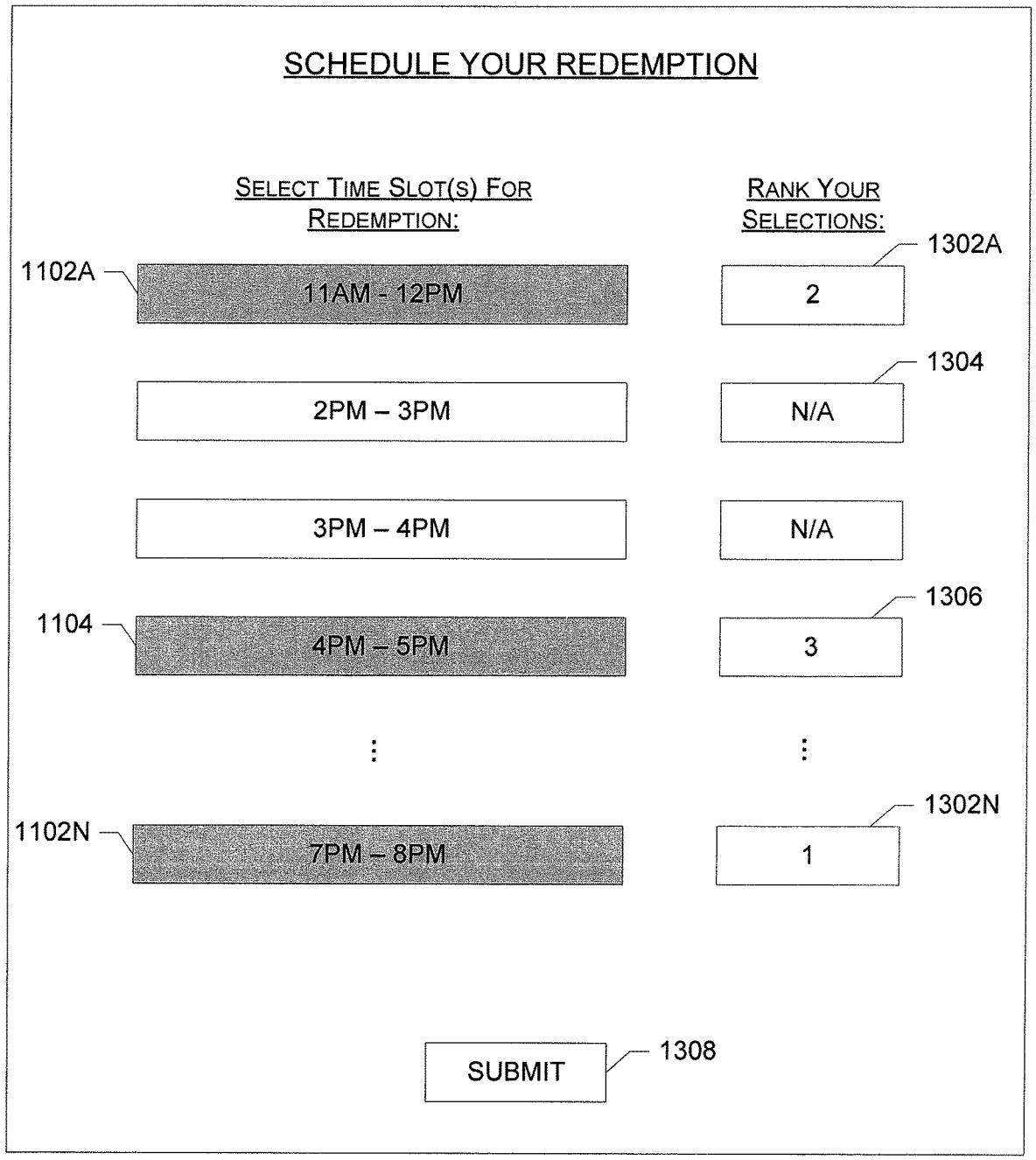
Figure 14:
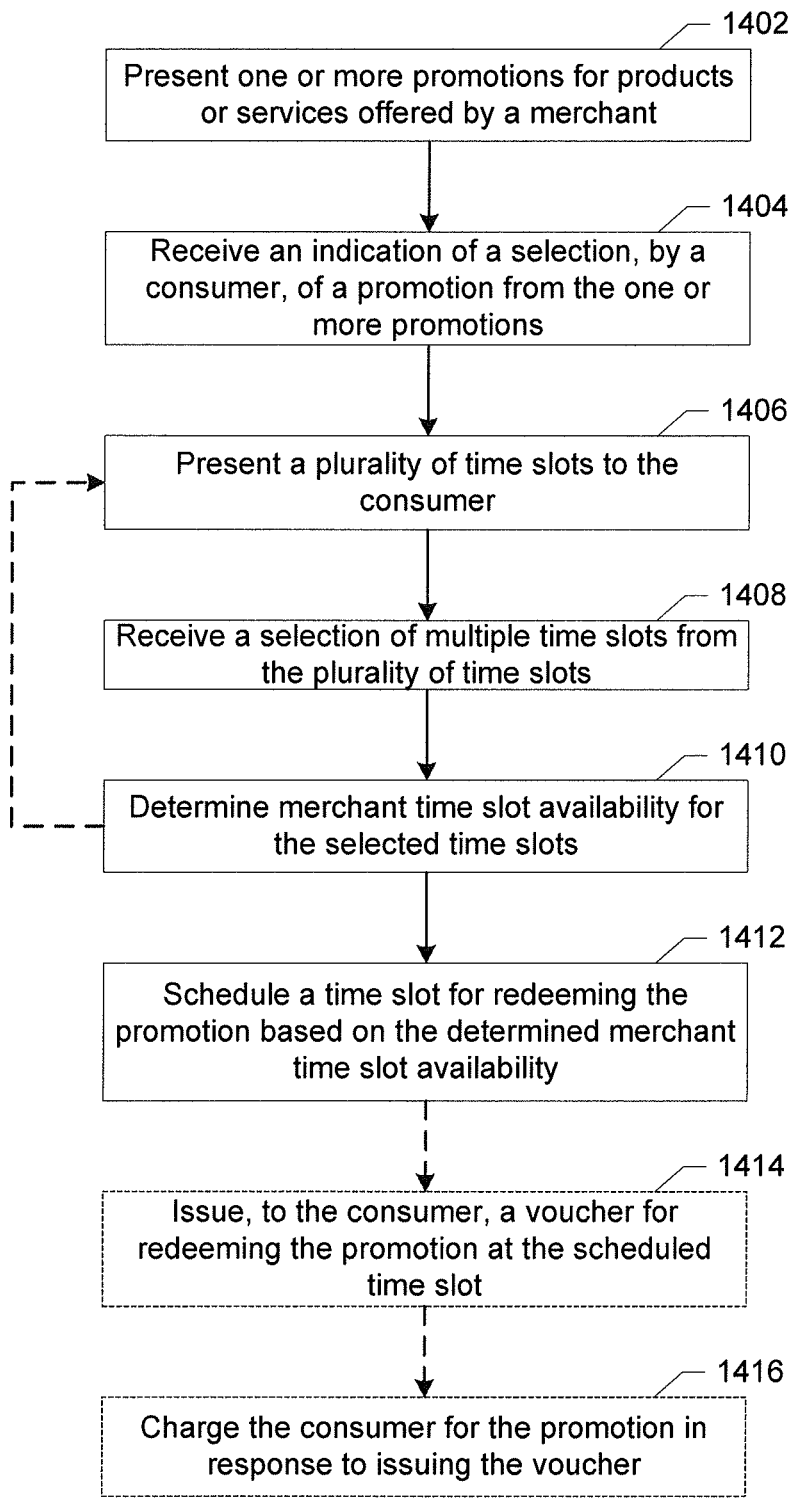
Figure 16:
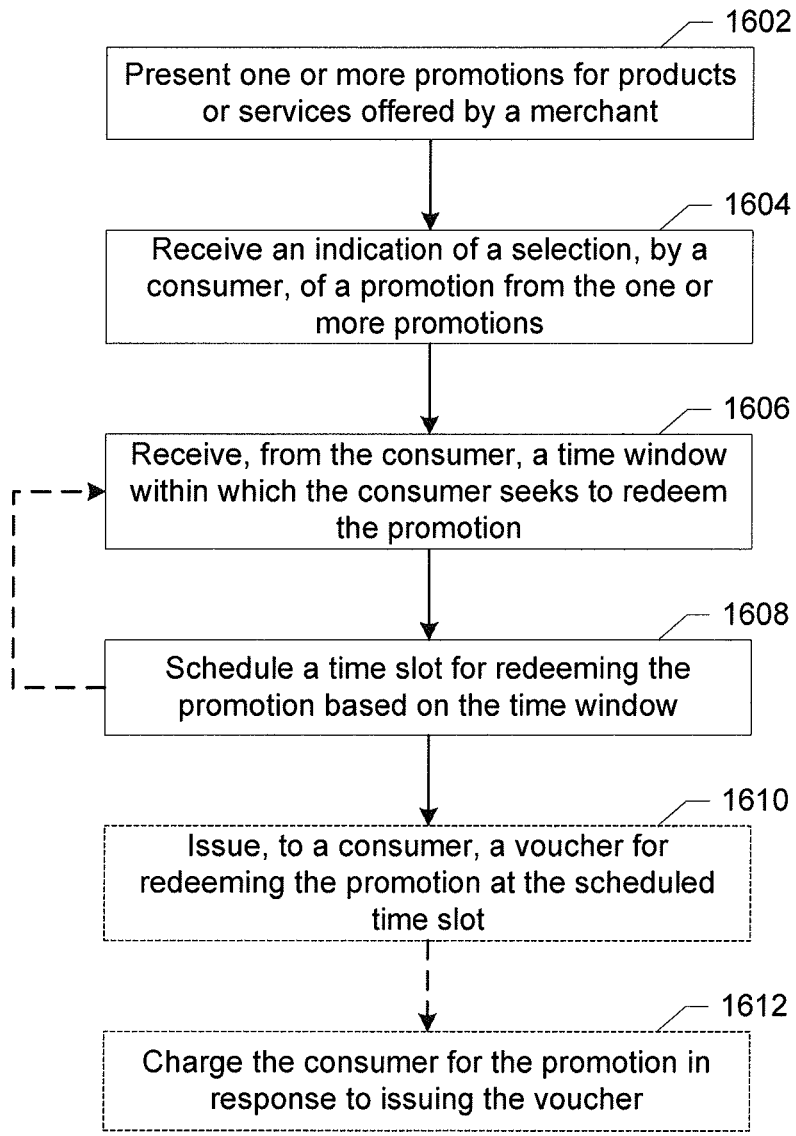
Figure 17:
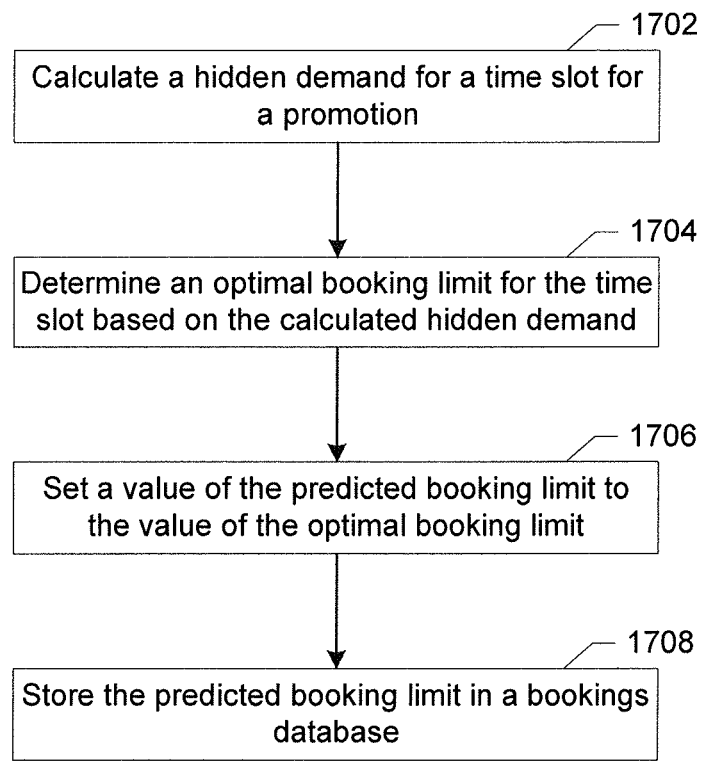
Figure 18:
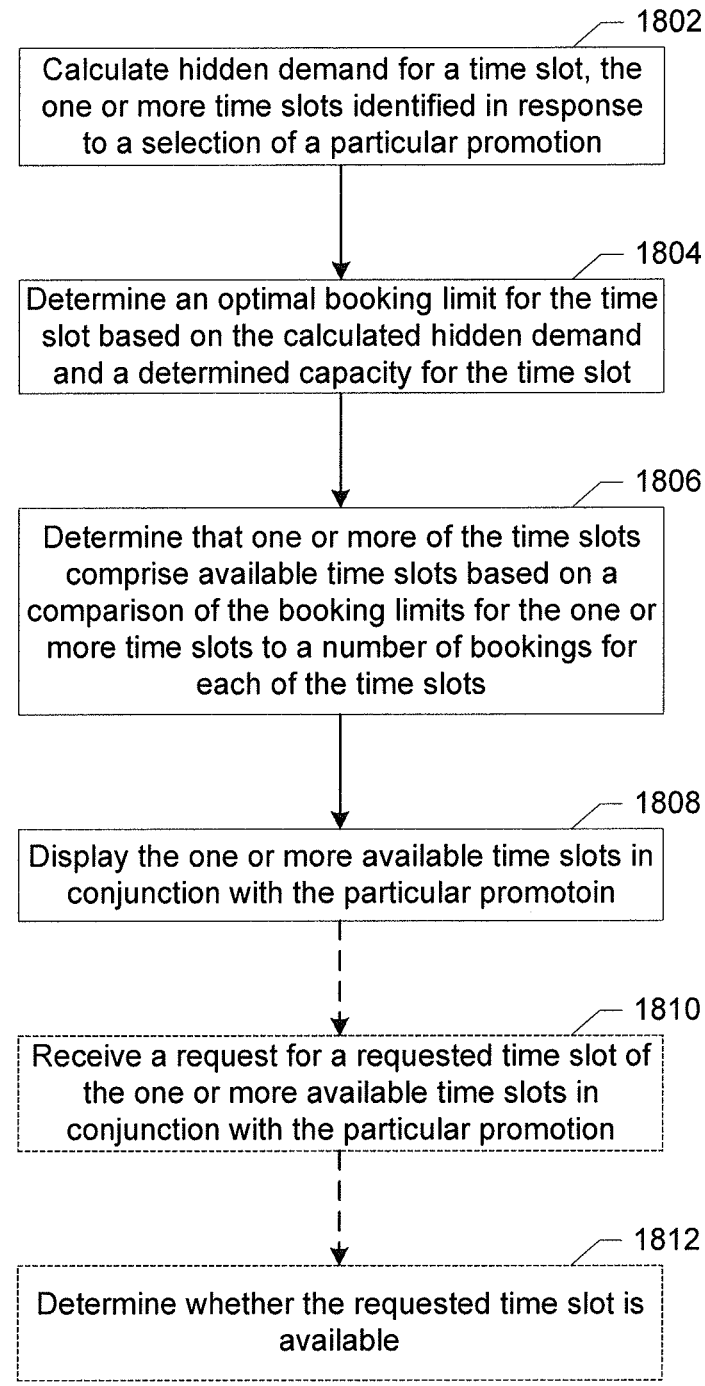
Figure 19:
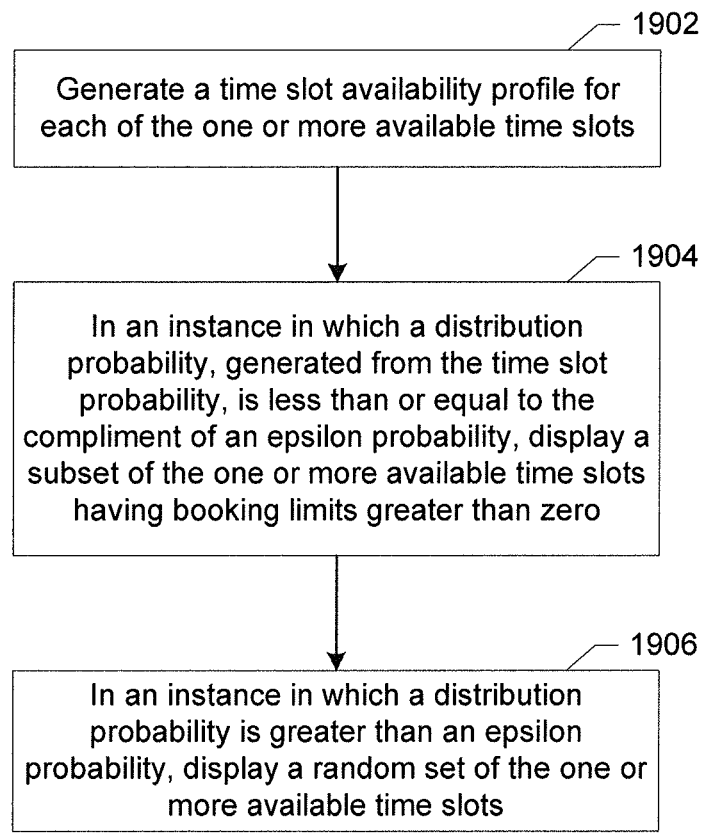
Figure 20:
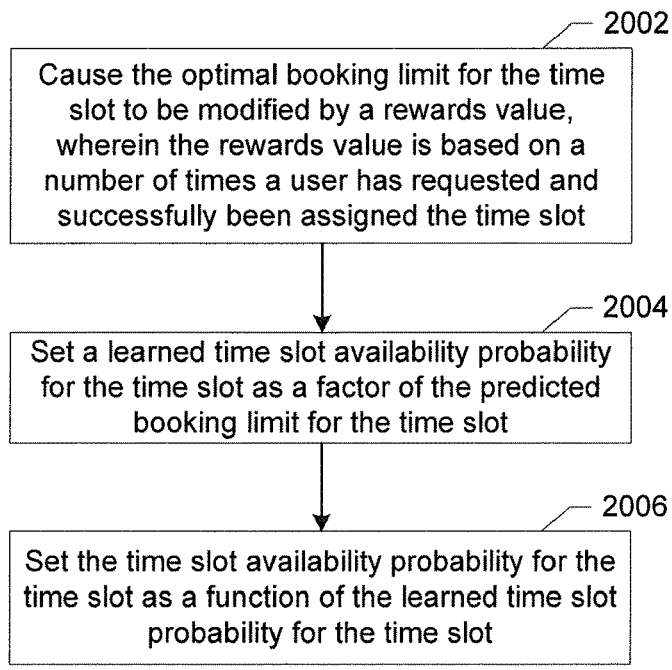
Figure 21:
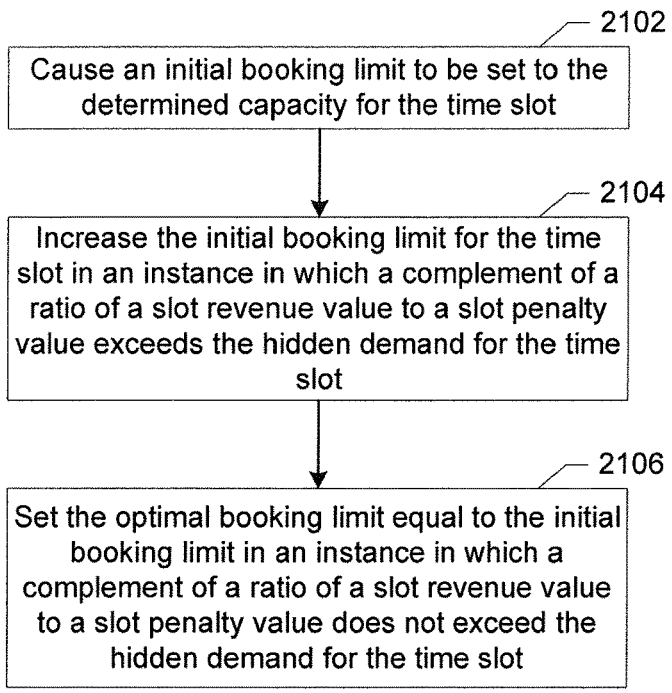

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a consumer or merchant, in accordance with an example embodiment of the present invention;

FIG. 4 illustrates a block diagram of an example merchant interface presenting a set of proposed time slots for selection by a merchant, in accordance with some example embodiments;

FIG. 5 illustrates an example commission schedule associated with a set of proposed time slots for selection by a merchant, in accordance with some example embodiments;

FIG. 6 illustrates another example commission schedule associated with a set of proposed time slots for selection by a merchant, in accordance with some example embodiments;

FIG. 7 illustrates a flowchart describing example operations for selecting, by a promotion system and a merchant, a set of time slots for use with a promotion, in accordance with some example embodiments;

FIG. 8 illustrates a block diagram of an example merchant interface presenting a request to schedule a redemption for promotion at a time slots, in accordance with some example embodiments;

FIG. 9 illustrates a flowchart describing example operations for scheduling redemption of a promotion at a time slot between a promotion system and a merchant, in accordance with some example embodiments;

FIG. 10 illustrates a consumer interface for selecting a promotion, in accordance with an example embodiment of the present invention;

FIG. 11 illustrates a consumer interface for selecting a time slot for redemption, in accordance with some example embodiments;

FIG. 12 illustrates a flowchart describing example operations for scheduling, by a promotion system and a consumer, a time slot for redeeming a promotion, in accordance with some example embodiments;

FIG. 13 illustrates a consumer interface for selecting multiple time slots for redemption, in accordance with some example embodiments;

FIG. 14 illustrates another flowchart describing example operations for scheduling, by a promotion system and a consumer, a time slot for redeeming a promotion, in accordance with some example embodiments;

FIG. 15 illustrates a consumer interface for requesting redemption of a promotion within a time window, in accordance with some example embodiments;

FIG. 16 illustrates a flowchart describing example operations for scheduling, by a promotion system and a consumer, redemption of a promotion based on a time window, in accordance with some example embodiments;

FIG. 17 illustrates a flowchart describing example operations for calculating a predicted booking limit, in accordance with some example embodiments;

FIG. 18 illustrates a flowchart describing example operations for displaying one or more time slots, in accordance with some example embodiments;

FIG. 19 illustrates another flowchart describing example operations for displaying one or more time slots, in accordance with some example embodiments;

FIG. 20 illustrates a flowchart describing example operations for setting a time slot availability probability, in accordance with some example embodiments; and FIG. 21 illustrates a flowchart describing example operations for determining an optimal booking limit, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "impression" may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the term "time slot" may comprise a period of time (e.g., a minute, an hour, a day, a week, etc.) during which a promotion may be redeemed by a consumer. In some examples, a time slot may take the form of an appointment, meeting, session, reservation, or the like. In cases of a promotion for a service, the time slot may comprise a period of time during which the redemption transaction must take place entirely within, or, in an alternative embodiment, the time slot may comprise a period of time during which the redemption must begin, even if redemption is not complete until after the end of the time slot. As an example of a time slot for use with a promotion for a service, using the aforementioned running company as an example provider, a time slot from 2 pm to 3 pm for redeeming a discounted running gait analysis may indicate that the analysis is scheduled to begin at 2 pm and will last until 3 pm, or may indicate, in alternative embodiments, that the analysis is available to begin at any time between 2 pm and 3 pm, even if it is completed after 3 pm. In the case of a promotion for a product, the redemption may take a fraction of the period of time encompassed by the time slot. Accordingly, using the aforementioned running company as the example provider, a time slot from 2 pm to 3 pm for redeeming a promotion for exchanging a $50 voucher and $50 for a $100 pair of running shoes may indicate that redemption must occur at some point between 2 pm and 3 pm. As such, by requiring an appointment for redemption of a product, in some examples the rate of redemptions may be normalized. In a getaway example, the time slot may represent a flight time, a hotel reservation and/or the like.

As used herein, the term "time window" may comprise a period of time (e.g., a minute, an hour, a day, a week, etc.) including one or more time slots for redeeming a promotion. For example, using the aforementioned running company as an example provider, a consumer may select a time window from 10 am to 3 pm for redeeming a promotion for exchanging a $50 voucher and $50 for a $100 pair of running shoes. This time window may include multiple time slots (e.g., 10 am-11 am, 11 am-12 pm, etc.) that are acceptable to the consumer.

As used herein, the term "booking" may comprise an indication of a time slot within which a promotion has been scheduled for redemption. For example, using the aforementioned running company as the example provider, a booking may comprise an indication that a consumer is scheduled to redeem a promotion for a running gait analysis at the running company during a 2 pm-3 pm time slot.

As used herein, the term "booking limit" may comprise a maximum number of bookings that may be scheduled by a promotion and marketing service for a time slot for a promotion. For example, using the aforementioned running company as the example provider, given a two person booking limit for a 2 pm-3 pm time slot for redeeming a running gait analysis at the running company, the promotion and marketing service may only schedule two redemptions of the running gait analysis promotion for the 2 pm-3 pm time slot. Given perfect information, an optimal booking limit may be calculated exactly. However, in practical applications with incomplete information, the booking limit comprises a predicted value.

As used herein, the term "booking capacity" may comprise a maximum number of bookings that may be fulfilled by a merchant for a time slot for a product or service. For example, using the aforementioned running company as the example provider, the running company may have a three person booking capacity for a 2 pm-3 pm time slot for a running gait analysis at the running company, indicating that the running company does not have enough resources to staff any additional running gait analyses during the 2 pm-3 pm time slot. In some examples capacity may be calculated using a capacity calculator such as the capacity calculator found in Ser. No. 13/830,243 filed Mar. 14, 2013, the entirety of which is incorporated by reference herein in its entirety.

As used herein, the term "hidden demand" may comprise a number of bookings for a time slot for a product or service that are placed with a merchant from sources outside the promotion and marketing service. In this regard, the sum of the hidden demand and the booking limit equals the booking capacity of a time slot for a product or service. For example, using the aforementioned running company as the example provider, the running company may have a one person hidden demand for a 2 pm-3 pm time slot for a running gait analysis at the running company, indicating that one person is anticipated to book the 2 pm-3 pm time slot for a running gait analysis from outside the promotion and marketing service. Given perfect information, the hidden demand may be known exactly. However, in practical applications, the hidden demand comprises a predicted value.

As used herein, the term "commission" (i.e., promotion and marketing service margin) may comprise a portion of a promotion purchase price retained by a promotion and marketing service. For example, using the aforementioned running company as the example provider, consider a promotion of $50 for $100 towards the purchase of a new pair of shoes at the running company. The purchase price of the promotion is $50. The commission comprises the portion of this $50 purchase prince retained by the promotion and marketing service in exchange for managing the promotion.

Overview

A method, apparatus, and computer program product are provided in accordance with an example embodiment of the present invention in order to improve the generation and redemption of promotions using an availability engine that is able to optimize and predict booking limits for time slots for promotions.

For a promotion and marketing service and all merchants offering a promotion using a promotion and marketing service, primary goals of offering promotions, in some examples, are to increase customer traffic, develop brand recognition, and increase revenue. For such consumer-facing business, reputational costs can often significantly damage the ability to attract future consumers, and therefore reputational costs can quickly translate into economic costs.

As it relates to embodiments of the present invention, such reputational costs may arise from offering promotions, in that it is challenging to predict the demand for merchant resources accurately enough to both minimize the idling of resources and maximize the number of promotions that a merchant may offer. There accordingly exists a need for a system that can more accurately predict demand for products and services in order to enable merchants to increase sales volumes while still avoiding the reputational and economic damage caused by poor promotion redemption scheduling.

Moreover, although purchasing promotions often provides a pleasant user experience, many consumers encounter frustration attempting to redeem promotions for services. For instance, a consumer who purchases a promotion for a massage may be dismayed to learn that the massage parlour is only ever open while the consumer is at work. Accordingly, additional reputational harm may occur as a result of frustrating redemption scheduling practices. Additionally, there may be harm to the promotion and marketing service if the consumer, by their own fault, fails to schedule the service prior to an expiration date.

Embodiments of the present invention address these problems by providing a system that estimates the hidden demand for a time slot for a product or service and then, advantageously in some examples, allows the user to schedule a service at the time of purchase. Moreover, based upon the hidden demand for the time slot and a merchant's capacity during the time slot, embodiments of the present invention can predict an optimal booking limit for various time slots using a promotional system, and present a user-friendly scheduling interface to consumers who wish to redeem their promotions. Moreover, by using reinforcement learning techniques, embodiments of the present invention are able to increase the accuracy of the hidden demand forecasting and optimal booking limit estimation, and, concomitantly, improve the set of time slots presented to consumers.

Based on the ability to predict an optimal booking limit for a time slot for a promotion, embodiments of the invention many increase the intelligence with which merchants design promotions, by enabling merchants to select time slots for redemption and accurately predict the level of increase in customer volume in advance.

Moreover, based on the ability to predict optimal booking limits, embodiments of the present invention enable more intelligent promotion redemption scheduling, by tailoring the manner with which the promotion and marketing service may interact with consumers to schedule time slots for redeeming promotions.

Accordingly, example embodiments of the present invention enhance the merchant and consumer experience by providing more powerful tools for generating promotions and scheduling redemptions of promotions.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. A promotion and marketing service may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may comprise a promotional server 104 in communication with a promotional database 106 that stores the set of promotions managed by the promotion and marketing service. The promotional system may further have access to a bookings database 108 that stores data indicating a set of time slots associated with each promotion stored in the promotional database 106, and a historical database 110 storing information regarding previously offered promotions. In various embodiments, promotional database 106, bookings database 108, and historical database 110 may be distinct databases, or may alternatively refer to a single database. The promotional system 102 is, in some examples, able to identify time slots relevant to a promotion, predict demand for the promotion at each time slot, offer the promotion to consumers, schedule time slots for redemption of the promotion, and implement iterative reinforcement learning techniques to improve accuracy of each of these functions, as will be described below. An additional description of scheduling operations that may be used alternatively or additionally is described in U.S. application Ser. No. 13/631,313, filed Sep. 28, 2012, the entirety of which is incorporated by reference herein.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, a booking optimization module 210, and a time slot management module 212, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The booking optimization module 210 may be used to calculate hidden demand for a time slot for a promotion and to predict an optimal booking limit for the time slot for the promotion, as will be described in greater detail below. In this regard, as noted above, the hidden demand for a time slot comprises the demand for the time slot that will be fulfilled without using the promotion. Similarly, the optimal booking limit comprises an estimated number of redemptions that may be scheduled for the time slot that produces the greatest value. In this regard, every time slot for a product or service has a capacity (e.g., a massage parlor with one masseuse has a capacity of 1 massage per time slot, whereas a massage parlor with two masseuses has a capacity of 2 massages per time slot, etc.) The hidden demand comprises the portion of the capacity that has already been reserved without the use of the promotion and marketing service. For example, using the 1 masseuse massage parlor, the hidden demand would be 0 or 1. If the hidden demand is 0, then the optimal booking limit is 1. Moreover, using reinforcement learning techniques, the booking optimization module 210 is able to dynamically improve its predictions over time and/or adjust its predictions in the face of updated demand patterns or altered time slots. In accomplishing these tasks, booking optimization module 210 may collect, store, and/or update data in bookings database 108 and/or historical database 110.

The time slot management module 212 may be used to identify time slots suitable for a promotion, allocate time slots to the promotion, manage consumer and merchant interactions regarding time slot availability, and schedule time slots for redeeming the promotion. The time slot management module 212 is further able to generate a proposed commission schedule for a set of time slots for a promotion, and associate time slots and corresponding commissions for the promotion. Additional discussion of proposed commission (i.e., provider margin or promotion and marketing service margin) is further described with respect to U.S. application Ser. No. 13/832,804, filed Mar. 15, 2013, the entirety of which is incorporated by reference herein. In alternate embodiments, the time slot management module 212 may be used to flatten or otherwise regulate redemptions of promotions, such as the redemption curve described with reference to FIG. 3 of U.S. application Ser. No. 13/796,635, filed Mar. 13, 2013, the entirety of which is incorporated by reference herein. In accomplishing these tasks, the time slot management module 212 may collect, store, and/or update data in bookings database 108 and/or historical database 110.

In one embodiment, a consumer or merchant may use the apparatus 200 (e.g., as a kiosk) to communicate with the promotional system 102 to update or view promotion redemption options and/or schedule redemption of a promotion. However, in some embodiments of the present invention, the consumer or merchant may perform these functions from outside of the promotional system 102 using, for example, an end-user device, such as consumer device 114 or merchant device 116.

Referring now to FIG. 3, a block diagram is illustrated showing an example end-user device, apparatus 300, which may be configured to enable a user to update or view promotion redemption options and/or schedule redemption of a promotion from outside the promotional system 102, in accordance with embodiments of the present invention.

In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Merchant Interaction

As described herein, embodiments of the present invention are disclosed for associating time slots with a promotion and for scheduling time slots for redemption of the promotion based on merchant availability.

Turning now to FIG. 4, an example merchant interface 400 is shown, with which a merchant may interact to associate time slots with a promotion. In this regard, merchant interface 400 may be presented during an initial promotion development process between the merchant and the promotion and marketing service, and more particularly may be presented after agreement regarding the product or service and, in some embodiments, after agreement regarding promotion fine print and purchase price. In one example embodiment, merchant interface 400 may comprise a web user interface. In this regard, merchant interface 400 may comprise a graphical user interface that enables the merchant, another computing device connected to the merchant interface 400, or the like, to exchange information with a promotion and marketing service regarding selection of time slots and/or commission terms for redeeming the promotion in selected time slots.

As shown in FIG. 4, merchant interface 400 may display a list of proposed time slots 402A to 402N for use with a promotion. The list of proposed time slots 402A-402N may be calculated based on data from bookings database 108 or historical database 110. In this regard, promotional system 102 may determine, by querying historical database 110, a standard set of time slots for the particular merchant offering the promotion or for the particular product or service associated with the promotion. Alternatively, by querying the historical database 110, the promotional system 102 may identify a set of time slots that includes every time slot previously offered for the particular product or service. Although shown in FIG. 4 as non-overlapping, in some embodiments the time slots 402A-402N may advantageously overlap based on the product or service associated with the promotion. For example, a promotion for an audio tour at a museum guided using a headphones or a handheld device may not require that each time slot is non-overlapping, because the scheduling is largely non-rivalrous (provided there are sufficient headphones or handheld devices). Accordingly, this example audio tour promotion may be associated with time slots that are staggered by 5 minutes, even though the audio tour itself lasts an hour.

Along with each time slot 402, merchant interface 400 may display a predicted booking limit 404 for the time slot. Accordingly, for time slots 402A-402N, merchant interface 400 may display predicted booking limits 404A-404N, respectively. As described in the Booking Optimization section, each predicted booking limit indicates a number of bookings that the promotion and marketing service may allocate for a time slot for the promotion.

Accordingly, merchant interface 400 presents the merchant with a list of time slot/predicted booking limit pairs

406 that may be selected for use with a promotion. By viewing time slot/predicted booking limit pairs 406, the merchant is able to understand the likely demand that will be added by virtue of associating a time slot with a promotion or alternatively the likely demand that the merchant already experiences for that time slot irrespective of the promotion. In addition, the booking limits establish a basis for the commission schedule, profit sharing, margin distribution or the like, as described below. Merchant interface 400 may further comprise an interactive interface enabling the merchant to select one or more specific time slots. In such embodiments, each time slot may comprise a selectable icon enabling the merchant to quickly and easily associate time slots with the promotion. Upon selection, merchant interface 400 may be updated to indicate to the merchant that the time slot has been selected. One example in which the merchant interface 400 may be updated to indicate selection is shown in FIG. 4, in which the coloring of time slot 408 is changed upon selection. Of course, other graphical illustrations for indicating selection are contemplated within the scope of the present invention, such as changing the font or size of selected time slots, bolding, italicizing, or underlining the graphical display of selected time slots, or the like. After selecting desired time slot(s) for use with the promotion, the merchant may transmit the selection(s) to the promotional server 104 by selecting the "Submit" icon 410.

Moreover, in some embodiments, the predicted booking limits 404A-404N may comprise editable fields that the merchant may adjust. In this regard, upon selection of a time slot 402, the merchant may select and revise a corresponding booking limit field 404, to indicate an actual booking limit that the merchant commits to fulfilling.

Turning now to FIG. 5, merchant interface 500 shows an example commission schedule that in some embodiments may be presented to the merchant in conjunction with the list of time slots 402A-402N. The commission schedule displays a list of commissions 502A-502N due the promotion and marketing service for promotion redemption at the list of time slots 402A-402N. Specifically, each commission 502 indicates a commission charged for a corresponding time slot 402. Moreover, each commission is based on the predicted booking limit for the time slot. In this regard, the commission for each time slot may be determined by a sales representative of the promotion and marketing system. In some embodiments, however, the commission for each time slot may be determined algorithmically as a function of the predicted booking limit, the merchant capacity of the time slot, and/or minimum and maximum possible commissions determined by the promotion and marketing system using, for example, regional or global norms stored in bookings database 108 or historical commissions for similar services stored in historical database 110).

The commission may further be based on goals of the promotion and marketing service. For instance, in some embodiments such as the example commission schedule shown in FIG. 5, the promotion and marketing service may charge higher commissions for low-demand time slots (which have accordingly higher predicted booking limits) and may charge lower commissions for high demand time slots (which likely will have significant hidden demand and accordingly lower predicted booking limits). Because merchants naturally may seek to maximize revenue and avoid idling resources, merchants may be willing to pay higher commissions to fill low demand time slots. Similarly, the promotion and marketing service may require higher margins for offering promotions in time slots that have low demand, to compensate for the accordingly reduced likelihood of consumers scheduling redemption in such time slots.

In other embodiments, the promotion and marketing service may charge lower commissions for time slots with higher predicted booking limits. In this regard, with a higher predicted booking limit, the probability of encountering a collision (e.g., situations where a customer seeks to book a time slot, only to learn that the merchant no longer has availability at that time slot) may be expected to diminish, thus reducing the chance of suffering any reputational harm from collisions.

In any event, as shown in FIG. 5, selection of a time slot 408 associates the time slot 408 with the promotion, and further approves the corresponding commission 502 shown in the commission schedule. Accordingly, the merchant interface 500 may be updated to indicate to the merchant that the commission has been approved.

Turning now to FIG. 6, an example commission schedule 600 is shown for use in some embodiments which additionally includes preferred customer commissions 602A-602N for the time slots 402A-402N. Preferred customer commissions may be associated with preferred customers, which in some embodiments are identified, based on a consumer purchase history, purchase velocity or the like, as the portion of its consumers that may be notably more likely than average to purchase products or services. In other embodiments, preferred customers may comprise customers who have collected a baseline level of rewards over a predetermined period of time or who have purchased a preferred membership plan from the promotion and marketing service. As with time slots 402A-402N, preferred customer commissions 602A-602N comprise icons selectable by the merchant. In this regard, each preferred customer commission 502 indicates a commission charged for a corresponding time slot 402 if the redeeming consumer is a preferred customer of the promotion and marketing service.

Selection of a preferred customer commission 602 enables redemption at the corresponding time slot by a preferred customer, upon which the preferred customer commission 602 will be charged by the promotion and marketing service. In the example illustrated in FIG. 6, the commission charged for redemptions by preferred customers is increased, as those customers are judged to be more likely to make additional purchases and therefore are more valuable to merchants. In this fashion, the promotion and marketing service may incentive merchants to offer additional or alternative time slots to preferred customers of the promotion and marketing service. Moreover, the promotion and marketing service may raise commissions on preferred customers, as preferred customers are more likely to actually make a purchase than other customers.

In some embodiments consistent with FIG. 6, selection of a time slot 408 associates the time slot 408 with the promotion and also triggers default selection of the corresponding basic customer commission (equivalent to commission 502 shown in FIG. 5) associated with the time slot 408 (see, for example, the group of time slots 606). However, the merchant may additionally selected the preferred customer commission (enabling redemption at the time slot by a preferred customer), and may toggle selection of the basic customer commission and the preferred customer commission 602, so long as at least one of commission type is always selected for every selected time slot. As illustrated in FIG. 6, in some examples, both commissions may be selected (see 604), only a basic customer commission is selected (see 606), or only a preferred customer commission is selected (see 608). In this fashion, merchant interface 600 adds additional flexibility to the time slot association process by enabling the merchant to select the types of customers that may redeem promotions at various time slots.

FIG. 7 illustrates a flowchart containing example operations for associating time slots with a promotion from the perspective of a merchant interface with which merchants may interact. The operations illustrated in FIG. 7 may, for example, be performed by the merchant device 116, such as apparatus 300, and may use processor 302, memory 304, user interface 306, and communications module 308. In this regard, the operations may be performed with the assistance of, and/or under the control of one or more devices, such as promotional server 104, such as, in at least one example embodiment, apparatus 200, and may use processor 202, memory 204, I/O module 206, communications module 208, booking optimization module 210, and time slot management module 212.

In operation 702, the apparatus 300 includes means, such as user interface 306, communications module 308, or the like, for receiving, from a merchant, details of a promotion for a good or service. The details may comprise selection of a product or service for the promotion and, in some embodiments, may include promotion fine print and a promotion purchase price.

In operation 704, the apparatus 300 includes means, such as user interface 306, communications module 308, or the like, for presenting a set of proposed time slots for redeeming the promotion and a predicted booking limit for each proposed time slot. In this regard, the predicted booking limit of the time slots may be determined, for example, in the manner described with reference to FIG. 17 below.

In operation 706 the apparatus 300 includes means, such as user interface 306, communications module 308, or the like, for receiving, from the merchant, selection of one or more time slots from the set of proposed time slots. The set of proposed time slots may be received via merchant selection of presented time slot icons, as previously described. In some embodiments, however, the selection of one or more time slots may be received by other alternative methods.

Optionally, in operation 708, the apparatus 300 may include means, such as user interface 306, communications module 308, or the like, for presenting a commission schedule for the set of proposed time slots, wherein receiving the selection of time slots for use with the promotion is based on the commission schedule. The commission schedule may be developed, for example, by time slot management module 212 of the promotional server. As previously described in connection with FIGS. 5 and 6, the commission schedule includes commissions for a promotion and marketing service for redeeming the promotion at each proposed time slot. In this regard, the commissions may be based on a predicted demand of each proposed time slot. Moreover, the membership status may be based on a consumer purchase history, purchase velocity or the like. As such, the promotion and marketing service may identify preferred customers or confer preferred membership status on a certain portion of its consumers that may be notably more likely than average to purchase products or services. Alternatively or additionally, the promotion and marketing service may identify preferred customers or confer preferred membership status on a certain portion of its consumers who have reached predetermined rewards thresholds or who have purchased upgrades to a preferred membership status.

Turning now to FIG. 8, an example merchant interface 800 is illustrated for receiving an indication of whether the merchant is available at a time slot. In this regard, although, as noted previously, a booking limit for a time slot for a promotion may be predicted, prior to scheduling a redemption for a specific time slot, the promotion and marketing system must determine that the merchant actually has availability to facilitate the redemption at a selected time slot. In this regard, merchant interface 800 is presented to the merchant, including an identification of the promotion 802, the selected time slot for redemption 804, and optionally an indication of whether the consumer seeking redemption is a preferred customer 806 (which may be indicated by a filled or unfilled box, or any other suitable indicator). In response to receiving merchant interface 800, the merchant may select yes (808) or no (810) to transmit, via merchant device 116, an indication of actual availability for redeeming the promotion in the requested time slot. In this regard, actual availability may be based on a known merchant capacity, the hidden demand for the product or service for the time slot, whether the consumer is a preferred customer, and/or any other unusual event that may affect the merchant's ability to fulfil the request (unexpected staffing shortages, or the like).

As shown in FIG. 9, a flowchart is illustrated containing example operations for scheduling time slots for redeeming a promotion from the perspective of a merchant interface with which merchants may interact. The operations illustrated in FIG. 9 may, for example, be performed by the merchant device 116, such as apparatus 300, and may use processor 302, memory 304, user interface 306, and communications module 308. The operations may further be performed with the assistance of, and/or under the control of promotional server 104, such as, in one embodiment, apparatus 200, and may use processor 202, memory 204, I/O module 206, communications module 208, booking optimization module 210, and time slot management module 212.

In operation 902, the apparatus 300 includes means, such as user interface 306, communications module 308, or the like, for receiving a request for redemption of a promotion at a time slot. The time slot may be identified by, for example, time slot management module 212 based on a predicted booking limit of a set of time slots and a number of bookings for each time slot of the set of time slots. Moreover, in some embodiments, the predicted booking limit of the set of time slots may be calculated for each time slot of the set of time slots by booking optimization module 210. In this regard, the predicted booking limit for each time slot may be calculated, for example, in the manner described with reference to FIG. 17 below. Moreover, time slot management module 212 may identify the time slot based on the predicted booking limit of the set of time slots and the number of bookings schedule for each time slot, by determining, for each time slot, whether the predicted booking limit is equal to or greater than a current number of bookings for the time slot, wherein the identified time slot comprises the time slot having a lowest ration of the current number of bookings to its predicted booking limit.

In operation 904, the apparatus 300 includes means, such as user interface 306, communications module 308, or the like, for presenting the selected time slot to a merchant. In this regard, presentation of the selected time slot may include presentation of a merchant interface such as example merchant interface 800, shown in FIG. 8. Accordingly, presenting the selected time slot to a merchant may, in some embodiments, further include identifying a promotion for which the time slot is requested, and identifying whether the consumer requesting redemption is a preferred customer of the promotion and marketing service.

In operation 906, the apparatus 300 includes means, such as user interface 306, communications module 308, or the like, for receiving, from the merchant, an indication of whether the time slot is available. Alternatively or additionally, the apparatus 300 may be in data communication with scheduling software for the merchant and therefore may automatically determine whether a time slot is available.

In operation 908, the apparatus 300 includes means, such as user interface 306, communications module 308, or the like, for, in an instance in which the time slot is available, scheduling the time slot for redeeming the promotion.

Optionally, in operation 910, the apparatus 300 may include means, such as user interface 306, communications module 308, or the like, for causing a consumer to be charged in an instance in which the time slot is scheduled for redeeming the promotion.

Accordingly, as disclosed in conjunction with FIGS. 4-9, embodiments of the present invention describe operations by which a promotion and marketing service may interact with a merchant to identify time slots suitable for a promotion, allocate time slots to the promotion, manage merchant interactions regarding time slot availability, and schedule time slots for redeeming the promotion.

Consumer Interaction

Additional embodiments of the present invention are designed to receive redemption selections from a consumer and schedule redemption of a promotion in accordance with consumer selections and/or actual time slot availability.

Turning now to FIG. 10, an example consumer interface 1000 is shown, with which a consumer may interact. Consumer interface 1000 may comprise an electronic communication. In one such example, the electronic communication 1000 may be an e-mail viewable in an e-mail viewing application or using web-based e-mail service. Communication 100 may alternative be a webpage viewable with a web browser (e.g., a website hosted by the promotion and marketing system), or an application associated with the promotion and marketing service (e.g., a smartphone "app" provided by the promotion and marketing service).

The example electronic communication 1000 includes impressions 1002-1012 advertising one or more promotions. In some embodiments, consumer selection of an impression may direct the consumer to more information about the content associated with the impression. For example, selecting an impression may provide the consumer with additional information about the promotion and an interface allowing the consumer to purchase the promotion.

As shown in FIG. 11, after purchasing a promotion the consumer may be presented with a consumer interface 1100 that displays a list of one or more time slots 1102A to 1102N which the consumer may select to schedule redemption of the promotion. The list of one or more time slots 1102A-1102N may be calculated based on data from bookings database 108 or historical database 110. In this regard, promotional system 102 may determine, by querying historical database 110, a standard set of time slots for the particular merchant offering the promotion or for the particular product or service associated with the promotion. Alternatively, by querying the historical database 110, the promotional system 102 may identify a set of time slots that includes every time slot previously offered for the particular product or service. Although shown in FIG. 11 as non-overlapping, in some embodiments the one or more time slots 1102A-1102N may advantageously overlap based on the product or service associated with the promotion, as described previously in connection with FIG. 4.

Consumer interface 1100 may further comprise an interactive interface enabling the consumer to select one of time slots 1102A-1102N. In this regard, each time slot may comprise a selectable icon enabling the consumer to quickly and easily associate time slots with the promotion. Upon selection, consumer interface 1100 may be updated to indicate to the consumer that the time slot has been selected. As shown with time slot 1104, one example mechanism for indicating selection of a time slot is shown in FIG. 11, in which the coloring of the time slot 1104 is changed upon selection. Of course, other graphical illustrations for indicating selection are contemplated within the scope of the present invention, such as changing the font or size of selected time slots, bolding, italicizing, or underlining the graphical display of selected time slots, or the like. After selecting a desired time slot for redemption of the promotion, the consumer may transmit the selection to the promotional server 104 by selecting the "Submit" icon 1106.

Turning now to FIG. 12, a flowchart is illustrated containing example operations for scheduling time slots for redeeming a promotion from the perspective of a consumer interface with which consumers may interact. The operations illustrated in FIG. 12 may, for example, be performed by a consumer device 114, such as apparatus 300, and may use processor 302, memory 304, user interface 306, and communications module 308. The operations may further be performed with the assistance of, and/or under the control of promotional server 104, such as, in one embodiment, apparatus 200, and may use processor 202, memory 204, I/O module 206, communications module 208, booking optimization module 210, and time slot management module 212.

In operation 1202, the apparatus 300 includes means, such as user interface 306, communications module 308, or the like, for presenting one or more promotions for products or services offered by one or more merchants. As described in connection with FIG. 10, promotions may be presented in an electronic communication, such as an email, an application, or a webpage. In response, in operation 1204, the apparatus 300 includes means, such as user interface 306, communications module 308, or the like, for receiving an indication of a selection, by a consumer, of a promotion from the one or more promotions.

In operation 1206, the apparatus 300 includes means, such as user interface 306, communications module 308, or the like, for presenting one or more time slots based on predicted booking limits of a set of time slots including the one or more time slots, wherein each time slot indicates a period of time during which the promotion may be scheduled for redemption. In one embodiment, time slot management module 212 may determine the one or more time slots to present. In this regard, presenting the one or more time slots based on predicted booking limits may, in some embodiments, include determining, for each time slot, whether the predicted booking limit of the time slot is equal to or greater than a current number of bookings for the time slot, wherein the time slots presented comprise those for which the predicted booking limit is less than the current number of bookings, thus indicating availability for the current consumer.

In one embodiment, the presentation of time slots to the consumer is further based on a membership status of the consumer. For instance, the presented time slots may include additional time slots in an instance in which the consumer is identified as a preferred member. In another embodiment, the one or more time slots presented may include preferred time slots. In one such embodiment, the preferred time slots may be chosen based on preferences of the merchant or the promotion and marketing service. For example, if a restaurant offers a promotion using a promotion and marketing service, the restaurant may prefer that promotional consumers redeem promotions at traditionally off-peak times, such as between 2 and 4 pm. In another example, the promotion and marketing service may prefer that promotional consumers redeem promotions in time slots having the highest predicted booking limit, to avoid potential collisions, or may prefer that promotional consumers redeem promotions in time slots having highest associated commission, to maximize revenue.

In yet another embodiment, the apparatus 200 includes means, such as booking optimization module 210, or the like, for calculating the predicted booking limits of the set of time slots, such as in the manner described with reference to FIG. 17 below.

In operation 1208, the apparatus 300 includes means, such as user interface 306, communications module 308, or the like, for receiving a selection of a time slot from the one or more time slots.

In operation 1210, the apparatus 300 includes means, such as user interface 306, communications module 308, or the like, for determining merchant time slot availability for the selected time slot. In this regard, determining merchant time slot availability may include presenting, to the merchant, the selected time slot, and receiving, from the merchant, an indication of whether the time slot is available. In one embodiment, however, determining merchant time slot availability may include accessing a merchant's scheduling system, or the like, to automatically download time slot availability information. In an instance in which the selected time slot is not available, however, the apparatus 300 may repeat operations 1206, 1208, and 1210 until a selected time slot is available.

In operation 1212, the apparatus 300 includes means, such as user interface 306, communications module 308, or the like, for scheduling a time slot for redeeming the promotion based on the determined merchant time slot availability.

Optionally, in operation 1214, the apparatus 300 may include means, such as user interface 306, communications module 308, or the like, for issuing, to the consumer, a voucher for redeeming the promotion at the scheduled time slot.

Finally, in operation 1216, the apparatus 300 may optionally include means, such as user interface 306, communications module 308, or the like, for charging the consumer for the promotion in response to issuing the voucher. In this regard, charging the consumer may comprise a credit, debit, or electronic funds transfer for the purchase price of the promotion.

FIG. 11, described previously, illustrates a consumer interface 1100 using which a consumer may select a time slot to schedule redemption of a promotion. In an alternative embodiment illustrated in FIG. 13, a consumer interface 1300 is disclosed using which a consumer may select multiple time slots within which the consumer is willing to redeem a promotion. In this regard, after purchasing a promotion the consumer may be presented with consumer interface 1300, which, like consumer interface 1100, displays a list of one or more time slots 1102A to 1102N which the consumer may select to schedule redemption of the promotion. As described in connection with FIG. 11, the list of one or more time slots 1102A-1102N may be calculated based on data from bookings database 108 or historical database 110. The promotional system 102 may determine, by querying historical database 110, a standard set of time slots for the particular merchant offering the promotion or for the particular product or service associated with the promotion. Alternatively, by querying the historical database 110, the promotional system 102 may identify a set of time slots that includes every time slot previously offered for the particular product or service. As with FIG. 11, although the time slots shown in FIG. 13 are non-overlapping, in some embodiments the one or more time slots 1102A-1102N may advantageously overlap.

Like consumer interface 1100, consumer interface 1300 may comprise an interactive interface enabling the consumer to select one of time slots 1102A-1102N. In this regard, each time slot may comprise a selectable icon enabling the merchant to quickly and easily associate time slots with the promotion. Upon selection, consumer interface 1300 may be updated to indicate to the consumer that the time slot has been selected. As shown with time slot 1104, one example mechanism for indicating selection comprises coloring the time slot 1104 upon selection. Of course, other graphical illustrations for indicating selection are contemplated within the scope of the present invention, such as changing the font or size of selected time slots, bolding, italicizing, or underlining the graphical display of selected time slots, or the like.

Unlike consumer interface 1100, however, consumer interface 1300 enables a consumer to select more than one time slot 1102. In this regard, after selecting desired time slots for redemption of the promotion, the consumer may transmit the selections to the promotional server 104 by selecting the "Submit" icon 1308. Upon receipt of the selected time slots, the promotional system 104, and more particularly time slot management module 212 of apparatus 200 may then determine merchant time slot availability and schedule one of the selected time slots for redeeming the promotion, as described below in connection with FIG. 14.

Returning now to FIG. 13, in some embodiments, consumer interface 1300 further enables the consumer to rank the selected time slots in order of preference, thus increasing the likelihood that an acceptable time slot can be scheduled for redemption of the promotion. To this end, in correspondence with time slots 1102A-1102N, consumer interface 1300 further includes rank fields 1302A-1302N, respectively. When a time slot 1102 is selected, the consumer interface 1300 activates the corresponding rank field 1302 (e.g., rank field 1306) to enable entry of a numeric ranking of the newly selected time slot (e.g., the consumer's first preference, second preference and third preference in the example shown in FIG. 13). In some embodiments, upon selection of a time slot, the associated rank field 1302 is assigned the lowest rank position until modified by the consumer. In this way, consumer interface 1300 prevents partial rank-ordering of a set of selected time slots. Moreover, unlike activated rank fields, rank fields associated with unselected time slots cannot be edited, to prevent the rank-ordering of unselected time slots.

After selecting desired time slots for redemption of the promotion and specifying an appropriate rank-ordering of the selected time slots, the consumer may transmit the selections, in addition to rank-ordering data, to the promotional server 104 by selecting the "Submit" icon 1308.

Turning now to FIG. 14, a flowchart is illustrated containing example operations for scheduling time slots for redeeming a promotion from the perspective of a consumer interface with which consumers may interact. The operations illustrated in FIG. 14 may, for example, be performed by a consumer device 114, such as apparatus 300, and may use processor 302, memory 304, user interface 306, and communications module 308. The operations may further be performed with the assistance of, and/or under the control of promotional server 104, such as, in one embodiment, apparatus 200, and may use processor 202, memory 204, I/O module 206, communications module 208, booking optimization module 210, and time slot management module 212.

In operation 1402, the apparatus 300 includes means, such as user interface 306, communications module 308, or the like, for presenting one or more promotions for products or services offered by one or more merchants. As described in connection with FIG. 10, promotions may be presented in an electronic communication, such as an email, an application, or a webpage. In response, in operation 1404, the apparatus 300 includes means, such as user interface 306, communications module 308, or the like, for receiving an indication of a selection, by a consumer, of a promotion from the one or more promotions.

In operation 1406, the apparatus 300 includes means, such as user interface 306, communications module 308, or the like, for presenting a plurality of time slots for selection. In one embodiment, the plurality of time slots presented are chosen based on predicted booking limits of a set of time slots including the plurality time slots. In this regard, time slot management module 212 may determine the plurality of time slots to present. Moreover, presenting the plurality of time slots based on predicted booking limits may, in some embodiments, include determining, for each time slot, whether the predicted booking limit of the time slot is equal to or greater than a current number of bookings for the time slot, wherein the time slots presented comprise those for which the predicted booking limit is less than the current number of bookings.

In one embodiment, the presentation of time slots to the consumer is further based on a membership status of the consumer. For instance, the presented time slots may include additional time slots in an instance in which the consumer is identified as a preferred member. In another embodiment, the one or more time slots presented may include preferred time slots. In one such embodiment, the preferred time slots may be chosen based on preferences of the merchant or the promotion and marketing service. For example, if a restaurant offers a promotion using a promotion and marketing service, the restaurant may prefer that promotional consumers redeem promotions at traditionally off-peak times, such as between 2 and 4 pm. In another example, the promotion and marketing service may prefer that promotional consumers redeem promotions in time slots having the highest predicted booking limit, to avoid potential collisions, or may prefer that promotional consumers redeem promotions in time slots having highest associated commission, to maximize revenue.

In yet another embodiment, the apparatus 200 includes means, such as booking optimization module 210, or the like, for calculating the predicted booking limits of the set of time slots, such as in the manner described with reference to FIG. 17 below.

In operation 1408, the apparatus 300 includes means, such as user interface 306, communications module 308, or the like, for receiving a selection of multiple time slots from the plurality of time slots.

In operation 1410, the apparatus 300 includes means, such as user interface 306, communications module 308, or the like, for determining merchant time slot availability for the selected time slot. In this regard, determining merchant time slot availability may include presenting, to the merchant, each selected time slot, and receiving, from the merchant, an indication of whether the time slot is available. In one embodiment, however, determining merchant time slot availability may include accessing a merchant's scheduling system, or the like, to automatically download time slot availability information.

In another embodiment, determining merchant time slot availability may be based on the rank-ordering of the selected time slots. In this embodiment, the apparatus 300 may include means, such as user interface 306, communications module 308, or the like, for receiving, from the consumer, a rank-ordering of the selected time slots. Thereafter, determining merchant time slot availability may comprise iteratively analyzing the selected time slots, starting from a highest ranked selected time slot and proceeding in rank order until an indication of availability is received from the merchant. To accomplish this, the apparatus 300 may include means, such as user interface 306, communications module 308, or the like, for presenting, to the merchant offering the promotion, a selected time slot, and for receiving, from the merchant, an indication of whether the time slot is available. By iteratively stepping through the rank-ordered list of selected time slots in this fashion, the time slot for redeeming the promotion will comprise the first (and therefore highest ranked) selected time slot for which the indication of availability is received from the merchant.

In an instance in which no selected time slot is available, the apparatus 300 may repeat operations 1406, 1408, and 1410 until a selected time slot is available.

Continuing to operation 1412, the apparatus 300 includes means, such as user interface 306, communications module 308, or the like, for scheduling a time slot for redeeming the promotion based on the determined merchant time slot availability.

Optionally, in operation 1414, the apparatus 300 may include means, such as user interface 306, communications module 308, or the like, for issuing, to the consumer, a voucher for redeeming the promotion at the scheduled time slot.

Finally, in operation 1416, the apparatus 300 may optionally include means, such as user interface 306, communications module 308, or the like, for charging the consumer for the promotion in response to issuing the voucher.

Turning now to FIG. 15, a consumer interface 1500 is illustrated using which a consumer may select a time window within which the consumer wishes to schedule redemption. Unlike the embodiments described previously in connection with FIG. 11 through FIG. 14, the consumer need not select time slots using consumer interface 1500. Rather, the consumer may select the relevant promotion using field 1502, and subsequently choose a much broader time range within which redemption would be convenient. For instance, the consumer may wish to have his/her running gait analysis performed on Sunday, Jun. 30, 2013, but has no time preference. In this example, as shown in FIG. 15, the consumer may enter the desired date of redemption in date field 1504, and may enter a time window within which redemption is convenient, using time fields 1506 and 1508. Finally, the user may select the "Send" icon 1510 to deliver the message to the promotional system 102.

Turning now to FIG. 16, a flowchart is illustrated containing example operations for scheduling time slots for redemption based on a consumer-selected time window, as shown from the perspective of a consumer interface with which consumers may interact. The operations illustrated in FIG. 16 may, for example, be performed by a consumer device 114, such as apparatus 300, and may use processor 302, memory 304, user interface 306, and communications module 308. The operations may further be performed with the assistance of, and/or under the control of promotional server 104, such as, in one embodiment, apparatus 200, and may use processor 202, memory 204, I/O module 206, communications module 208, booking optimization module 210, and time slot management module 212.

In operation 1602, the apparatus 300 includes means, such as user interface 306, communications module 308, or the like, for presenting one or more promotions for products or services offered by one or more merchants. As described in connection with FIG. 10, promotions may be presented in an electronic communication, such as an email or a webpage. In response, in operation 1604, the apparatus 300 includes means, such as user interface 306, communications module 308, or the like, for receiving an indication of a selection, by a consumer, of a promotion from the one or more promotions.

In operation 1606, the apparatus 300 includes means, such as user interface 306, communications module 308, or the like, for receiving, from the consumer, a time window within which the consumer seeks to redeem the promotion. Consumer selection and transmission of such a time window is described above in connection with FIG. 15.

In operation 1608, the apparatus 300 includes means, such as processor 302, or the like, for scheduling a time slot for redeeming the promotion based on the time window. This operation may, in some embodiments, be facilitated by time management module 212. In this regard, scheduling a time slot for redeeming the promotion based on the time window includes identifying a set of time slots within the time window, determining merchant time slot availability for the set of time slots, and scheduling the time slot for redeeming the promotion based on the merchant time slot availability. In this regard, determining merchant time slot availability may include presenting, to the merchant, each selected time slot, and receiving, from the merchant, an indication of whether the time slot is available. In one embodiment, however, determining merchant time slot availability may include accessing a merchant's scheduling system, or the like, to automatically download time slot availability information.

In one embodiment, the presentation of time slots to the consumer is further based on a membership status of the consumer. For instance, the presented time slots may include additional time slots in an instance in which the consumer is identified as a preferred member. In another embodiment, the one or more time slots presented may include preferred time slots. In one such embodiment, the preferred time slots may be chosen based on preferences of the merchant or the promotion and marketing service. For example, if a restaurant offers a promotion using a promotion and marketing service, the restaurant may prefer that promotional consumers redeem promotions at traditionally off-peak times, such as between 2 and 4 pm. In another example, the promotion and marketing service may prefer that promotional consumers redeem promotions in time slots having highest associated commission, to maximize revenue.

In an instance in which no selected time slot is available, the apparatus 300 may present to the consumer a request for an alternative time window, return to operation 1606 to receive a subsequent time window from the consumer, and then schedule the time slot for redeeming the promotion based on the second time window.

Optionally, in operation 1610, the apparatus 300 may include means, such as user interface 306, communications module 308, or the like, for issuing, to the consumer, a voucher for redeeming the promotion at the scheduled time slot.

Finally, in operation 1612, the apparatus 300 may optionally include means, such as user interface 306, communications module 308, or the like, for charging the consumer for the promotion in response to issuing the voucher.

Accordingly, as disclosed in conjunction with FIGS. 10-16, embodiments of the present invention describe operations by which a promotion and marketing service may interact with a consumer to schedule a time slot in which to redeem a promotion.

Predicting Booking Limits

As described above, embodiments of the present invention are disclosed for associating time slots with a promotion and for scheduling time slots for redemption of the promotion based on merchant availability. In this regard, predicting booking limits for a series of time slots for a promotion enables the promotional system 102 to present information to consumers and merchants to avoid collisions in promotion redemption scheduling and accordingly improve customer experience.

In this regard, to predict optimal booking limits, one must efficiently solve the problem of guessing the availability of a given merchant for a time slot for a promotion. To accomplish this goal, the promotional system 102 is configured to model the demand curve for a slot $s_i \in S$, where S is a representation set of time slot availabilities for a given week. Each slot $s_i$ can be assumed to have a probability of being available equal to $\rho_i$, where $\rho_i$ represents the following density function:

$$\rho_i = \frac{1}{2} Pr(\text{Available})_i + \frac{1}{2}(1 - Pr(\text{Busy})_i)$$

which in this case represents the normalized probabilities encountered for a given service from the historical data taken from historical database 110 after cleaning data and removing outliers (e.g., for a given slot ρ equal to the normalization of the average between E(available) and E(1−busy) for that given time slot). Assuming that each user who books a product or service has an independent probability of booking at a given time, then, for example, this hidden demand distributes like Binomial($C_i$, $\rho_i$), where $C_i$ is the capacity of that merchant on slot $s_i$, and may be estimated using historical data, querying the merchant, or a combination of the two. This demand curve represents the hidden demand that typically cannot be seen by a promotion and marketing service (which often does not have access to merchants' complete availability history). For the purposes of this description, the demand for slot i is herein referred to as h, and the cumulative density function of this demand is herein referred to as G(h) and can be approximated by an empirical cumulative density function produced using historical information.

Accordingly, for a given demand $d_i$ that distributes like, in some examples, Poisson(λ) for a given λ (Cumulative Density Function F(h)), for a merchant who is providing a given specific service at a price p, there is an associated penalty or cost for the merchant and for the promotion and marketing service of providing a bad customer experience (by having to tell the customer that his/her slot was previously taken and that he/she either has to book the second one supplied or choose another. That penalty cost is herein referred to as D, where, in some examples, D≫p.

Given these facts, the revenue for slot i (which represents a time slot as described herein) comprises:

$$\text{Revenue} = R_i = p \times s_i - D \times \max(0, s_i + h_i - C_i)$$

where $s_i = \min(d_i, b_i)$ and where $b_i$ is the optimal booking limit (e.g., maximum number of bookings a promotion and marketing service will schedule on a given slot i). As such, the booking limit b is accordingly configured to be determined by the booking availability engine.

In this regard, the calculations described herein operated under the following assumptions in some examples, but should not necessarily be limited to these assumptions in each case:

I. There are no no-shows and no cancellations;
II. The price is the same for every slot;
III. h and d are independent; and
IV. Time slots are fixed.

To solve for the booking limit, the booking availability engine may determine the result of increasing the booking limit by one, or, in other words, going from b→b+1. The resulting expected revenue would fall into one of three scenarios, in some examples:

Scenario a) d≤b+1, in which case there is no change in the differential E(R|b+1)−E(R|b) given that, because this constraint is relaxed, increasing booking will not bring additional demand.

Scenario b) d>b+1, in which case demand will create an additional unit valued at p. In some examples, there are two possible results from this scenario:

Scenario b.1) b+h−C>0, in which the increase in p will be reduced by the penalty D. This is: p−D.

Scenario b.2) b+h−C<0, in which there is no penalty paid and the promotion will make an extra p.

Calculating the difference in expected values would yield, in some examples:

$$E(R|b+1) - E(R|b) = 0 \times F(b) + (1 - F(b)) \times [(p-D) \times (1 - G(C-b)) + p \times G(C-b)]$$

Given F(b) is always positive, the optimum value of the booking limit will be found, in some examples, when:

$$p - D + DG(C-b) \geq 0$$

$$1 - p/D \geq G(C-b)$$

where D is estimated based on historical data. In some examples, D may be equivalent to 2p. In some other examples, an appropriate penalty D may be determined using merchant and customer surveys. Alternatively, the penalty D may be determined automatically based on historical data regarding previously offered promotions (e.g., the penalty D may be set to the penalty of a successful previously offered promotion, the average of penalties of a set of previously offered promotions, or the like).

Accordingly, one example algorithm can be used, in some example embodiments, to calculate the booking limit:

Step 1: Initialize b=C
Step 2: If 1−p/D<G(C−b), STOP. Optimum has been reached.
Step 3: If 1−p/D>G(C−b), increase b→b+1 GOTO STEP 2

In an additional embodiment of the present invention, an algorithm for calculating a predicted booking limit may incorporate reinforcement learning. For instance, by simplifying the problem, a consumer may be defined as having two states:

NOT BOOKED (if the consumer has not chosen a slot or has been rejected a time slot previously); and
BOOKED (the consumer has a confirmed time slot).

In some examples, therefore, there is only one available action, which is to book the customer (i.e., BOOK). Accordingly, after selection of the action (e.g., to book the customer) there are two possible outcomes:

1: User selects a slot successfully (transition from NOT BOOKED to BOOKED) Update rewards as: r=0
2: User selects a slot and is rejected (transition from NOT BOOKED to NOT BOOKED) Update rewards as r=−1

The following algorithm will, in some examples, be usable to update p:

Step 1: b=b+r
Step 2: Update $\rho^* = \arg(G(C-b)=0)$
Step 3: $\rho = \rho + \alpha(\rho^* - \varphi)$, where a is a step function.

In some examples, one algorithm that may be configured to display availabilities to the user, such as is shown, for example, in FIGS. 11 and 13 and described in conjunction with operations 1206 and 1406 above, may be based on an e-greedy form using a SOFTMAX activation function based on a Boltzmann distribution to calculate the probabilities of choosing random bookings in the case, according to some examples:

Step 1: For every different slot time, an initial value of p can be developed based on Monte Carlo simulations and Heuristic Knowledge. In this regard, one can assume that the process is a Markovian Discrete Process.

Step 2: When customers retrieve availabilities, z is set with probability E.

Step 3: If z≤1−E, the presented or otherwise displayed time slots include all bookings where $b_j > 0$ for every slot time j (from the slot times the user selected).

Step 4: Else, for each time slot j (from the slot times the user selected), choose $b_j$ to display based on, in some examples, probability $$\frac{e^{b_j/\tau}}{\sum_{k=1}^{N} e^{b_k/\tau}}$$

where N is the number of slots for the selected (by the consumer) window, and τ is a measure of temperature. High temperatures cause, in some examples, the actions to be all (nearly) equally probable. Low temperatures cause a greater difference in selection probability for actions that differ in their value estimates. In examples, the booking optimization module 210 described herein may choose a low temperature, given selecting a slot with low estimated booking limit could be more pernicious than selecting one with high estimated booking limit.

Turning now to FIG. 17, a flowchart is illustrated for calculating booking limits of a set of time slots. The operations illustrated in FIG. 17 may, for example, be performed by the promotional server 104, such as, in one example embodiment, apparatus 200, and may use processor 202, memory 204, I/O module 206, communications module 208, booking optimization module 210, and time slot management module 212.

In operation 1702, the apparatus 200 includes means, such as processor 202, booking optimization module 210, time slot management module 212, or the like, for calculating a hidden demand for a time slot for a promotion. In some embodiments, the hidden demand for each of the set of proposed time slots may be calculated based on data from bookings database 108 or historical database 110.

In operation 1704, the apparatus 200 includes means, such as processor 202, booking optimization module 210, or the like, for determining an optimal booking limit for the time slot based on the calculated hidden demand. In this regard, the optimal booking limit for a time slot is further based on a booking capacity of the time slot and may be optimized in the manner described above.

In operation 1706, the apparatus 200 includes means, such as processor 202, booking optimization module 210, or the like, for setting a value of the predicted booking limit to the value of the optimal booking limit.

Finally, in operation 1708, the apparatus 200 includes means, such as memory 204, or the like, for storing the predicted booking limit (e.g., in bookings database 108).

Turning now to FIG. 18, a flowchart is illustrated for displaying available time slots to a consumer. The operations illustrated in FIG. 18 may, for example, be performed by a consumer device 114, such as apparatus 300, and may use processor 302, memory 304, user interface 306, and communications module 308. The operations may further be performed with the assistance of, and/or under the control of promotional server 104, such as, in one embodiment, apparatus 200, and may use processor 202, memory 204, I/O module 206, communications module 208, booking optimization module 210, and time slot management module 212.

In operation 1802, the apparatus 300 may include means, such as processor 302, or the like, for calculating hidden demand for one or more time slots, the one or more time slots defining a time duration during which a performance of a service offered by a promotion and marketing service can be performed, the one or more time slots identified in response to a selection of a particular promotion. In some embodiments, the hidden demand for each of the set of proposed time slots may be calculated based on data from bookings database 108 or historical database 110.

In operation 1804, the apparatus 300 may include means, such as processor 302, or the like, for determining a booking limit for each time slot of the one or more time slots based on the calculated demand for the time slot and a determined capacity for the time slot.

In operation 1806, the apparatus 300 may include means, such as processor 302, or the like, for determining that one or more of the time slots comprise available time slots based on a comparison of the booking limits for the one or more time slots to a number of bookings for each of the time slots.

In operation 1808, the apparatus 300 may include means, such as user interface 306, communications module 308, or the like, for displaying the one or more available time slots in conjunction with the particular promotion. Optionally, in operation 1810, the apparatus 200 may include means, such as user interface 306, communications module 308, or the like, for receiving a request for a requested time slot of the one or more available time slots in conjunction with the particular promotion.

Finally, in operation 1812, the apparatus 200 may optionally include means, such as processor 302, or the like, for determining whether the requested time slot is available.

Turning now to FIG. 19, a flowchart is illustrated for displaying available time slots to a consumer. The operations illustrated in FIG. 19 may, for example, be performed by a consumer device 114, such as apparatus 300, and may use processor 302, memory 304, user interface 306, and communications module 308. The operations may further be performed with the assistance of, and/or under the control of promotional server 104, such as, in one embodiment, apparatus 200, and may use processor 202, memory 204, I/O module 206, communications module 208, booking optimization module 210, and time slot management module 212.

In operation 1902, the apparatus 300 may include means, such as processor 302, or the like, for generating a time slot availability profile for each of the one or more available time slots. In some embodiments, the time slot availability probability may be set using an epsilon greedy policy, a SOFTMAX activation function, or a Monte Carlo simulation and historical data.

In operation 1904, the apparatus 300 may include means, such as processor 302, or the like, for, in an instance in which a distribution probability, generated from the time slot probability, is less than or equal to the compliment of an epsilon probability, displaying a subset of the one or more available time slots having booking limits greater than zero.

In operation 1906, the apparatus 300 may include means, such as processor 302, or the like, for in an instance in which a distribution probability is greater than an epsilon probability, displaying a random set of the one or more available time slots.

Turning now to FIG. 20, a flowchart is illustrated for generating the time slot availability probability for a time slot. The operations illustrated in FIG. 20 may, for example, be performed by a promotional server 104, such as, in one embodiment, apparatus 200, and may use processor 202, memory 204, I/O module 206, communications module 208, booking optimization module 210, and time slot management module 212.

In operation 2002, the apparatus 200 may include means, such as processor 202, booking optimization module 210, or the like, for causing the optimal booking limit for the time slot to be modified by a rewards value, wherein the rewards value is based on a number of times a user has requested and successfully been assigned the time slot.

In operation 2004, the apparatus 300 may include means, such as processor 202, booking optimization module 210, or the like, for setting a learned time slot availability probability for the time slot as a factor of the predicted booking limit for the time slot.

In operation 2006, the apparatus 200 may include means, such as processor 202, booking optimization module 210, or the like, for setting the time slot availability probability for the time slot as a function of the learned time slot probability for the time slot. In one embodiment, setting the time slot availability probability is further based on a step function.

Turning now to FIG. 21, a flowchart is illustrated for generating the time slot availability probability for a time slot. The operations illustrated in FIG. 20 may, for example, be performed by a promotional server 104, such as, in one embodiment, apparatus 200, and may use processor 202, memory 204, I/O module 206, communications module 208, booking optimization module 210, and time slot management module 212.

In operation 2102, the apparatus 200 may include means, such as processor 202, booking optimization module 210, or the like, for causing an initial booking limit to be set to the determined capacity for the time slot.

In operation 2104, the apparatus 300 may include means, such as processor 202, booking optimization module 210, or the like, for increasing the initial booking limit for the time slot in an instance in which a complement of a ratio of a slot revenue value to a slot penalty value exceeds the hidden demand for the time slot. In this regard, the slot penalty value may be generated based on a length of time during which a user does not purchase a promotion using the promotion and marketing service after a requested time slot is determined to be unavailable. Alternatively, the slot penalty value may be set by the promotion and marketing service and provided to a user who requests a time slot that is determined to be unavailable.

In operation 2106, the apparatus 200 may include means, such as processor 202, booking optimization module 210, or the like, for setting the optimal booking limit equal to the initial booking limit in an instance in which a complement of a ratio of a slot revenue value to a slot penalty value does not exceed the hidden demand for the time slot.

Accordingly, as disclosed in conjunction with FIGS. 17-21, embodiments of the present invention illustrate operations using which a promotion and marketing service may predict hidden demand for a product or service and predicts an optimal booking limit that minimizes a probability of a scheduling collision. Moreover, embodiments of the present invention include reinforcement learning operations that ensure accuracy of such predictions over time.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
    transmitting, by a communications module of a promotional server to a consumer device and for presentation by a consumer interface of the consumer device, one or more promotions for products or services offered by a merchant;
    receiving, by the communications module of the promotional server from the consumer device, an indication of a selection of a promotion from the one or more promotions;
    receiving, by the communications module of the promotional server from the consumer device, a time window within which a consumer seeks to redeem the promotion;
    identifying, by a time slot management module of the promotional server, a set of time slots within the time window;
    identifying, by the time slot management module of the promotional server, the consumer as a preferred member,
        wherein identifying the consumer as a preferred member comprises determining, by the time slot management module of the promotional server, that the consumer has reached a predetermined rewards threshold or has purchased an upgrade to preferred membership status from a promotion and marketing service, and
        wherein the set of time slots includes additional time slots based on the identification of the consumer as a preferred member that would not be included in the set of time slots if the consumer were not identified as a preferred member;
    determining, by a booking optimization module of the promotional server using a reinforcement learning technique and based on an empirical cumulative density function, a hidden demand for each time slot in the set of time slots, wherein the hidden demand for each time slot in the set of time slots comprises a portion of a capacity that has already been reserved without the use of a promotion and marketing service;

determining, by the booking optimization module of the promotional server, an optimal predicted booking limit for each time slot in the set of time slots based on the hidden demand for each time slot in the set of time slots,
  wherein determining the optimal predicted booking limit for each time slot in the set of time slots comprises increasing, by the booking optimization module of the promotional server, an initial booking limit for the time slot in an instance in which a complement of a ratio of a slot revenue value to a slot penalty value exceeds the hidden demand for the time slot, wherein the slot penalty value is based on a length of time during which, upon determining that the time slot is unavailable, the promotion is not redeemed using the promotion and marketing service;
receiving, by the communications module of the promotional server, a current number of bookings for each time slot in the set of time slots;
generating, by the booking optimization module of the promotional server, a comparison of the optimal predicted booking limit for each time slot in the set of time slots to the current number of bookings for each time slot in the set of time slots;
determining, by the booking optimization module of the promotional server, a merchant time slot availability for each time slot in the set of time slots based on the comparison of the optimal predicted booking limit for each time slot in the set of time slots to the current number of bookings for each time slot in the set of time slots; and
scheduling, by the time slot management module of the promotional server, a redemption time slot for redeeming the promotion based on the merchant time slot availability, wherein the redemption time slot comprises a time period within the time window.

2. The method of claim 1, wherein the determining, by the booking optimization module of the promotional server, the optimal predicted booking limit for each time slot in the set of time slots comprises:
  determining, by the booking optimization module of the promotional server, a capacity for each time slot in the set of time slots based on the comparison of the predicted booking limit for each time slot in the set of time slots to the current number of bookings for each time slot in the set of time slots;
  determining, by the booking optimization module of the promotional server, the initial booking limit for each time slot in the set of time slots based on the determined capacity for each time slot in the set of time slots;
  determining, by the booking optimization module of the promotional server, whether a complement of a ratio of a slot revenue value for each time slot in the set of time slots to a slot penalty value for each time slot in the set of time slots exceeds the hidden demand for each time slot in the set of time slots;
  in a first instance in which the complement of the ratio of the slot revenue value for each time slot in the set of time slots to the slot penalty value for each time slot in the set of time slots exceeds the hidden demand for each time slot in the set of time slots, generating, by the booking optimization module of the promotional server, an optimal predicted booking limit by increasing the initial booking limit for each time slot in the set of time slots until the complement of the ratio of the slot revenue value for each time slot in the set of time slots to the slot penalty value for each time slot in the set of time slots exceeds the hidden demand for each time slot in the set of time slots, wherein the optimal predicted booking limit is greater than the initial booking limit;
  in a second instance in which the complement of the ratio of the slot revenue value for each time slot in the set of time slots to the slot penalty value for each time slot in the set of time slots does not exceed the hidden demand for each time slot in the set of time slots, setting, by the booking optimization module of the promotional server, the optimal predicted booking limit equal to the initial booking limit; and
  setting, by the booking optimization module of the promotional server, the initial booking limit equal to the optimal predicted booking limit.

3. The method of claim 1, wherein the additional time slots comprise preferred time slots.

4. The method of claim 3, wherein the method further comprises determining, by the time slot management module of the promotional server, the preferred time slots based on preferences of the merchant or the promotion and marketing service.

5. The method of claim 1, wherein the generating, by the booking optimization module of the promotional server, the comparison of the optimal predicted booking limit for each time slot in the set of time slots to the current number of bookings for each time slot in the set of time slots comprises:
  determining a ratio of the current number of bookings for each time slot in the set of time slots to the optimal predicted booking limit for each time slot in the set of time slots, and
  wherein the scheduling, by the time slot management module of the promotional server, the redemption time slot for redeeming the promotion based on the merchant time slot availability comprises identifying, by the time slot management module of the promotional server, a time slot of the set of time slots having a lowest ratio among the set of time slots and designating such time slot as the redemption time slot.

6. The method of claim 1, further comprising issuing, to the consumer device, a voucher for redeeming the promotion at the redemption time slot.

7. The method of claim 6, further comprising initiating an electronic funds transfer for the promotion in response to issuing the voucher.

8. The method of claim 1, wherein, in an instance in which no time slots are available within the time window, identifying the set of time slots within the time window comprises:
  transmitting, by the communications module of the promotional server for display by the consumer interface of the consumer device, a request for an alternative time window;
  receiving, by the communications module of the promotional server from the consumer device, a second time window within which the consumer seeks to redeem the promotion; and
  identifying, by the time slot management module of the promotional server, a second set of time slots within the alternative time window, and
  wherein the set of time slots comprises the second set of time slots.

9. The method of claim 1, wherein the current number of bookings for each time slot in the set of time slots comprises current number of bookings reserved by the promotion and marketing service for each time slot in the set of time slots, wherein the current number of bookings reserved by the promotion and marketing service for each time slot comprises a portion of the total number of bookings reserved for each time slot.

10. The method of claim 1, wherein the portion of the capacity that has already been reserved without the use of the promotion and marketing service defining the hidden demand for each time slot in the set of time slots is an unknown portion.

11. An apparatus comprising a processor and a non-transitory memory, the memory storing computer program code that, when executed by the processor, causes the apparatus to:

transmit, by a communications module of the apparatus to a consumer device and for presentation by a consumer interface of the consumer device, one or more promotions for products or services offered by a merchant;

receive, by the communications module of the apparatus from the consumer device, an indication of a selection of a promotion from the one or more promotions;

receive, by the communications module of the apparatus from the consumer device, a time window within which a consumer seeks to redeem the promotion;

identify, by a time slot management module of the apparatus, whether the consumer associated with the consumer device is a preferred member;

if the consumer is identified as the preferred member, identify, by the time slot management module of the apparatus, a first set of time slots within the time window as a selected set of time slots;

if the consumer is not identified as the preferred member, identify, by the time slot management module of the apparatus, a second set of time slots within the time window as the selected set of time slots, wherein the first set of time slots includes additional time slots based on the identification of the consumer as the preferred member that are not included in the second set of time slots;

determine, by a booking optimization module of the apparatus using a reinforcement learning technique and based on an empirical cumulative density function, a hidden demand for each time slot in the selected set of time slots, wherein the hidden demand for each time slot in the selected set of time slots comprises a portion of a capacity that has already been reserved without the use of a promotion and marketing service;

determine, by the booking optimization module of the apparatus, an optimal predicted booking limit for each time slot in the selected set of time slots based on the hidden demand for each time slot in the selected set of time slots, wherein the computer program code, when executed by the processor, further causes the apparatus to:

increase, by the booking optimization module of the apparatus, an initial booking limit for the time slot in a first instance in which a complement of a ratio of a slot revenue value to a slot penalty value exceeds the hidden demand for the time slot; and set, by the booking optimization module of the promotional server, the optimal predicted booking limit equal to the initial booking limit for the time slot in a second instance in which the complement of the ratio of the slot revenue value for the time slot to the slot penalty value does not exceed the hidden demand for the time slot;

wherein the slot penalty value represents a cost associated with scheduling an unavailable time slot from the set of time slots for redeeming the promotion;

receive, by the communications module of the apparatus, a current number of bookings for each time slot in the selected set of time slots;

generate, by the booking optimization module of the apparatus, a comparison of the optimal predicted booking limit for each time slot in the selected set of time slots to the current number of bookings for each time slot in the selected set of time slots;

determine, by the booking optimization module of the apparatus, a merchant time slot availability for each time slot in the selected set of time slots based on the comparison of the optimal predicted booking limit for each time slot in the selected set of time slots to the current number of bookings for each time slot in the selected set of time slots; and schedule, by the time slot management module of the apparatus, a redemption time slot for redeeming the promotion based on the merchant time slot availability, wherein the redemption time slot comprises a time period within the time window.

12. The apparatus of claim 11, wherein the computer program code, when executed by the processor, causes the apparatus to:

determine, by the time slot management module of the apparatus, that the consumer has reached a predetermined rewards threshold or has purchased an upgrade to a preferred membership status from a promotion and marketing service; and identify, by the time slot management module of the apparatus, the consumer as the preferred member based on the determination that the consumer has reached the predetermined rewards threshold or has purchased the upgrade to the preferred membership status from the promotion and marketing service.

13. The apparatus of claim 11, wherein the additional time slots comprise preferred time slots.

14. The apparatus of claim 13, wherein the computer program code, when executed by the processor, causes the apparatus to determine, by the time slot management module of the apparatus, the preferred time slots based on preferences of the merchant or the promotion and marketing service.

15. The apparatus of claim 11, wherein the computer program code, when executed by the processor, further causes the apparatus to issue, to the consumer device, a voucher for redeeming the promotion at the redemption time slot.

16. The apparatus of claim 15, wherein the computer program code, when executed by the processor, further causes the apparatus to initiate an electronic funds transfer for the promotion in response to issuing the voucher.

17. The apparatus of claim 11, wherein, in an instance in which no time slots are available within the time window, the computer program code, when executed by the processor, causes the apparatus to identify the set of time slots within the time window by:

presenting, by the consumer interface of the consumer device, a request for an alternative time window;

receiving, by the communications module of the promotional server from the consumer device, a second time window within which the consumer seeks to redeem the promotion; and identifying, by the time slot management module of the promotional server, a third set of time slots within the alternative time window, and wherein the redemption time slot is selected from the third set of time slots within the second time window.

18. The apparatus of claim 11, wherein the computer program code, when executed by the processor, further causes the apparatus to:

determine, by the booking optimization module of the apparatus, a ratio of the current number of bookings for each time slot in the selected set of time slots to the optimal predicted booking limit for each time slot in the selected set of time slots;

generate, by the booking optimization module of the apparatus, the comparison of the optimal predicted booking limit for each time slot in the selected set of time slots to the current number of bookings for each time slot in the selected set of time slots based on the ratio of the current number of bookings for each time slot in the selected set of time slots to the optimal predicted booking limit for each time slot in the selected set of time slots;

identify, by the time slot management module of the apparatus, a time slot of the identified set of time slots having a lowest ratio among the identified set of time slots; and designate, by the time slot management module of the apparatus, the identified time slot having the lowest ratio as the redemption time slot.

19. The apparatus of claim 11, wherein the current number of bookings for each time slot in the set of time slots comprises current number of bookings reserved by the promotion and marketing service for each time slot in the set of time slots, wherein the current number of bookings reserved by the promotion and marketing service for each time slot comprises a portion of the total number of bookings reserved for each time slot.

20. The apparatus of claim 11, wherein the portion of the capacity that has already been reserved without the use of the promotion and marketing service defining the hidden demand for each time slot in the set of time slots is an unknown portion.

21. A non-transitory computer program product comprising a non-transitory computer-readable storage medium storing computer program code that, when executed by an apparatus, causes the apparatus to:

transmit, by a communications module of the apparatus to a consumer device and for presentation by a consumer interface of the consumer device, one or more promotions for products or services offered by a merchant;

receive, by the communications module of the apparatus from the consumer device, an indication of a selection of a promotion from the one or more promotions;

receive, by the communications module of the apparatus from the consumer device, a time window within which a consumer seeks to redeem the promotion;

identify, by a time slot management module of the apparatus, whether the consumer associated with the consumer device is a preferred member;

if the consumer is identified as the preferred member, identify, by the time slot management module of the apparatus, a first set of time slots as a selected set of time slots within the time window;

if the consumer is not identified as the preferred member, identify, by the time slot management module of the apparatus, a second set of time slots as the selected set of time slots within the time window, wherein the first set of time slots includes additional time slots based on the identification of the consumer as the preferred member that are not included in the second set of time slots;

determine, by a booking optimization module of the apparatus using a reinforcement learning technique and based on an empirical cumulative density function, a hidden demand for each time slot in the selected set of time slots, wherein the hidden demand for each time slot in the selected set of time slots comprises a portion of a capacity that has already been reserved without the use of a promotion and marketing service;

determine, by the booking optimization module of the apparatus, an optimal predicted booking limit for each time slot in the selected set of time slots based on the hidden demand for each time slot in the selected set of time slots, wherein the computer program code, when executed by the apparatus, further causes the apparatus to:

increase, by the booking optimization module of the apparatus, an initial booking limit for the time slot in a first instance in which a complement of a ratio of a slot revenue value to a slot penalty value exceeds the hidden demand for the time slot; and set, by the booking optimization module of the promotional server, the optimal predicted booking limit equal to the initial booking limit for the time slot in a second instance in which the complement of the ratio of the slot revenue value for the time slot to the slot penalty value does not exceed the hidden demand for the time slot;

wherein the slot penalty value represents a cost associated with scheduling an unavailable time slot from the set of time slots for redeeming the promotion;

receive, by the communications module of the apparatus, a current number of bookings for each time slot in the selected set of time slots;

generate, by the booking optimization module of the apparatus, a comparison of the optimal predicted booking limit for each time slot in the selected set of time slots to the current number of bookings for each time slot in the selected set of time slots;

determine, by the booking optimization module of the apparatus, a merchant time slot availability for each time slot in the selected set of time slots based on the comparison of the optimal predicted booking limit for each time slot in the selected set of time slots to the current number of bookings for each time slot in the selected set of time slots; and schedule, by the time slot management module of the apparatus, a redemption time slot for redeeming the promotion based on the merchant time slot availability, wherein the redemption time slot comprises a time period within the time window.

* * * * *